US012761368B2

(12) United States Patent
Inokuchi et al.

(10) Patent No.: US 12,761,368 B2
(45) Date of Patent: Oct. 13, 2026

(54) REMOTE AIRFLOW OBSERVATION DEVICE, REMOTE AIRFLOW OBSERVATION METHOD, AND PROGRAM

(71) Applicant: JAPAN AEROSPACE EXPLORATION AGENCY, Tokyo (JP)

(72) Inventors: Hamaki Inokuchi, Tokyo (JP); Nobuki Kotake, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 1230 days.

(21) Appl. No.: 17/597,566

(22) PCT Filed: Jul. 17, 2020

(86) PCT No.: PCT/JP2020/027858

§ 371 (c)(1),
(2) Date: Jan. 11, 2022

(87) PCT Pub. No.: WO2021/024759

PCT Pub. Date: Feb. 11, 2021

(65) Prior Publication Data

US 2022/0155460 A1 May 19, 2022

(30) Foreign Application Priority Data

Aug. 8, 2019 (JP) ................................ 2019-146735

(51) Int. Cl.
*G01S 17/95* (2006.01)
*G01P 5/26* (2006.01)
*G01S 17/58* (2006.01)

(52) U.S. Cl.
CPC ................ *G01S 17/95* (2013.01); *G01P 5/26* (2013.01); *G01S 17/58* (2013.01)

(58) Field of Classification Search
CPC ........ G01S 17/95; G01S 17/58; G01S 7/4876; G01P 5/26; G01W 2001/003; Y02A 90/10
(Continued)

(56) References Cited

U.S. PATENT DOCUMENTS

2012/0092645 A1* 4/2012 Inokuchi ................ G01S 17/58 356/28.5
2013/0088705 A1 4/2013 Asahara et al.
(Continued)

FOREIGN PATENT DOCUMENTS

EP 3 467 543 A1 4/2019
JP 2002-196075 A 7/2002
(Continued)

OTHER PUBLICATIONS

Supplementary European Search Report dated Jun. 2, 2023 in European Application No. 20849690.1.
(Continued)

*Primary Examiner* — Aditya S Bhat
(74) *Attorney, Agent, or Firm* — SALIWANCHIK, LLOYD & EISENSCHENK

(57) ABSTRACT

[Object] To provide a remote airflow observation device, a remote airflow observation method, and a program that are capable of eliminating the influence of scattered waves from the ground or some object and improving the reliability of airflow observation.
[Solving Means] A Doppler Lidar 100 includes: a measurement unit 110 that radiates transmission light including pulse-form laser light, receives reflected light of the radiated transmission light as reception light, and outputs a received signal for calculating a wind speed value on the basis of the transmission light and the reception light; and a signal processor 8 that performs processing for distributing the
(Continued)

received signal to range bins by time-dividing the received signal and for removing a signal derived from a hard target from the received signal.

16 Claims, 26 Drawing Sheets

(58) Field of Classification Search
USPC .......................................................... 702/191
See application file for complete search history.

(56) References Cited

U.S. PATENT DOCUMENTS

| | | | | |
|---|---|---|---|---|
| 2019/0018144 | A1* | 1/2019 | Imaki ...................... | G01S 7/486 |
| 2020/0371218 | A1 | 11/2020 | Inokuchi | |
| 2022/0171059 | A1* | 6/2022 | Salsbury ................. | G01S 7/484 |

FOREIGN PATENT DOCUMENTS

| | | | |
|---|---|---|---|
| JP | 2009-162678 | A | 7/2009 |
| JP | 2009-300133 | A | 12/2009 |
| JP | 5252696 | B2 | 4/2013 |
| JP | 2013-83467 | A | 5/2013 |
| JP | 5618313 | B2 | 11/2014 |
| JP | 2015-108557 | A | 6/2015 |
| JP | 5881099 | B2 | 3/2016 |
| JP | 2017-67680 | A | 4/2017 |
| JP | 2019-100943 | A | 6/2019 |
| WO | 2017/130315 | A1 | 8/2017 |

OTHER PUBLICATIONS

International Search Report dated Sep. 24, 2020 in International Application No. PCT/JP2020/027858.

Inokuchi, H. et al., "Development of an Onboard Doppler Lidar for Flight Safety," Journal of Aircraft, Jul.-Aug. 2009, 46(4):1411-1415, American Institute of Aeronautics and Astronautics, Inc.

Office Action dated Mar. 15, 2023 in Japanese Application No. 2019-146735.

* cited by examiner

REMOTE AIRFLOW OBSERVATION DEVICE, REMOTE AIRFLOW OBSERVATION METHOD, AND PROGRAM

CROSS-REFERENCE TO RELATED APPLICATIONS

This application is the U.S. national stage application of International Patent Application No. PCT/JP2020/027858, filed Jul. 17, 2020, which claims the benefit under 35 U.S.C. § 119 of Japanese Application No. 2019-146735, filed Aug. 8, 2019, the disclosures of each of which are incorporated herein by reference in their entirety.

TECHNICAL FIELD

The present invention relates to a remote airflow observation device, a remote airflow observation method, and a program that are used by an aircraft during a landing approach, for example. The present invention relates to a remote airflow observation device, a remote airflow observation method, and a program that are also applicable to heavy clouds in observations from the ground, and flying objects such as birds and airplanes, for example.

BACKGROUND ART

Turbulence has recently attracted attention as a main cause of aircraft accidents, and a technique regarding a remote airflow observation device such as a Doppler Lidar using laser light has been researched and developed as an airborne remote airflow measurement device that detects turbulence in advance (see, for example, Non-Patent Literature 1).

The Doppler Lidar irradiates dust (aerosol) in the atmosphere with laser to extract Doppler shift components of scattered light thereof. This makes it possible to detect the speed of a target at each distance.

In order to use the Doppler Lidar to inhibit turbulence-induced accidents of the aircraft, the following methods are conceived, such as a method of reporting information of turbulence forward in a flight direction to a pilot such that the pilot copes with the turbulence by a flight to avoid the turbulence, switch-on of the seat belt sign, and the like, as disclosed in Patent Literature 1. In particular, since the concentration of aerosol particles that scatter laser light transmitted from the Doppler Lidar is high at a low altitude, turbulence during a landing approach, wind shear, and gusty wind (hereinafter, referred to as turbulence and the like) are likely to be detectable from a long distance.

In addition to the above, the flight speed of an aircraft is low during a landing approach, and pilots can make their own decisions on a go-around without permission of air traffic controllers. Comparing those points with a situation during high-altitude cruising, the usefulness of the Doppler Lidar is high even with the current techniques.

The inventors of the present invention propose a method of improving the performance of a Doppler Lidar in Patent Literature 2, a method of reducing unnecessary noise in Patent Literature 3, a method of accurately obtaining an airflow vector in Patent Literature 4, and a method of removing an erroneous detection in Patent Literature 5.

CITATION LIST

Patent Literature

Patent Literature 1: Japanese Patent No. 5618313
Patent Literature 2: Japanese Patent No. 5252696

Patent Literature 3: Japanese Patent No. 5881099
Patent Literature 4: Japanese Patent Application No. 2015-195895
Patent Literature 5: Japanese Patent Application No. 2017-234165

Non-Patent Literature

Non-Patent Literature 1: H. Inokuchi, H. Tanaka, and T. Ando, "Development of an Onboard Doppler LIDAR for Flight Safety," Journal of Aircraft, Vol. 46, No. 4, PP. 1411-1415, AIAA, July-August, 2009.

DISCLOSURE OF INVENTION

Technical Problem

In previous Doppler Lidars, for example, erroneous detections due to reflection from the ground during a landing approach have not been considered. FIG. 28 shows an example of the change in S/N during a landing approach in a Doppler Lidar mounted on an aircraft. It is found that a large signal at about 11 km ahead is a reflected signal from the ground, and a signal about 25 dB times as large as a signal at about 10 km point is obtained.

The inventors of the present invention have obtained new findings that scattered light due to aerosol particles in the atmosphere, which is reception light, is affected by the ground or some object, and thus decreases the reliability of airflow observation using the Doppler Lidar. For example, if the Doppler Lidar is utilized during a landing approach, a runway lies forward in the flight direction. Thus, the Doppler Lidar will simultaneously receive the aerosol particles in the atmosphere forward in the flight direction and the scattered light from the ground. The aerosol particles are so light that they move with airflow, whereas the ground is stationary. Steady airflow has no risk, and what is important is a change in airflow. The Doppler Lidar has falsely recognized in some cases that the airflow is largely changed on the basis of a difference in speed between non-hazardous steady wind and the stationary ground. Since the intensity of the ground reflection is much higher than that of the reflection by the aerosol particles in the air, if the airframe is stable and laser light is emitted in the same direction, it is sufficient to adopt an algorithm to ignore a measured value of a portion where the reception intensity increases sharply at a long distance as described in Patent Literature 1. However, since an aircraft enters the runway at a shallow angle, i.e., a path angle of about −3 degrees, and moreover, the attitude angle of the aircraft changes drastically in turbulent airflow, the range in which the ground is irradiated with laser light changes greatly. At that time, since the reception light is pulse-accumulated to obtain a wind speed, the scattered light from the aerosol particles in the atmosphere and the scattered light from the ground are mixed in a plurality of range bins. Therefore, it has been proven in demonstration tests that the discrimination between airflow data and unnecessary data due to the ground reflection is difficult to perform after the pulse accumulation of the reception light.

In view of the above circumstances, it is an object of the present invention to provide a remote airflow observation device, a remote airflow observation method, and a program that are capable of eliminating the influence of scattered waves from the ground or some object and improving the reliability of airflow observation.

Solution to Problem

A remote airflow observation device according to the present invention includes: a measurement unit that radiates transmission light including pulse-form laser light, receives reflected light of the radiated transmission light as reception light, and outputs a received signal for calculating a wind speed value on the basis of the transmission light and the reception light; and a signal processor that performs processing for distributing the received signal to range bins by time-dividing the received signal and for removing a signal derived from a hard target from the received signal.

In the remote airflow observation device according to the present invention, the signal processor detects, when the radiated transmission light is reflected by the hard target, a range bin including the signal derived from the hard target from the received signal on the basis of a phenomenon in which intensity of the reception light increases or a phenomenon in which a frequency fluctuation of the reception light becomes minimum, and excludes, when accumulating a spectrum of a digital signal corresponding to the received signal in each of the range bins, a range bin determined to include the signal derived from the hard target and another range bin far from the range bin from the accumulation of the spectrum.

In the present invention, a hard target is detected from data corresponding to each pulse and distance on the basis of spatial change information including a sharp increase in intensity value and narrowing of an acquired spectrum width, which are unique characteristics generated in irradiation of a hard target such as the ground, and the detection results are used to remove a signal derived from the hard target. Thus, the influence of scattered waves from the ground or some object can be eliminated, and the reliability of airflow observation can be improved. Further, in the present invention, it is possible to avoid accuracy degradation caused by accumulating received signals from the ground or the like and signals including only noise beyond the ground, and to improve accuracy and data reliability.

In the remote airflow observation device according to the present invention, the signal processor defines a sum of a mean and a standard deviation of the received signal in each of the range bins as an index, determines whether or not the index exceeds a predetermined threshold with respect to the received signal obtained per pulse of the laser light from a far range bin, and determines that the received signal of a range bin in which the index reaches the predetermined threshold or more first includes the signal derived from the hard target.

In the remote airflow observation device according to the present invention, in an SN ratio of the received signal per pulse of the laser light, the signal processor determines, when the SN ratio of the received signal of an n-th range bin at a short distance exceeds a predetermined threshold of the SN ratio of the received signal of an (n−1)-th range bin adjacent thereto on a far side, that the received signal of the n-th range bin includes the signal derived from the hard target. Here, the predetermined threshold is, for example, $TH_{ratio}$, which is expressed by $$TH_{ratio} = (R_{HT}/\pi)\beta$$

where $R_{HT}$ is reflectance of the hard target, and β is a backscatter coefficient.

In the remote airflow observation device according to the present invention, the signal processor scans a detection window with a predetermined time duration from a near side in a time axis direction in a time waveform of the received signal per pulse of the laser light, and determines, when a predetermined index relating to the received signal in the window is larger than a predetermined threshold, that the received signal of the range bin including the window includes the signal derived from the hard target.

In the remote airflow observation device according to the present invention, the index is a root mean square (RMS) of a residual with a first-order linear function by least squares approximation performed on a phase-value-fluctuating waveform subjected to unwrap processing after performing a Hilbert transform on the time waveform of the received signal in the window to derive a phase value.

In the remote airflow observation device according to the present invention, the signal processor embeds the intensity of the reception light at a time point at which the predetermined index relating to the received signal in the window is larger than the predetermined threshold first, as the intensity of the reception light at a time point after the first time point, uses the range bin corresponding to the time point for accumulation processing by using the intensity of the reception light, and excludes the range bins subsequent to the range bin from the accumulation.

In the remote airflow observation device according to the present invention, the signal processor calculates the spectrum of the digital signal corresponding to the received signal in each of the range bins per pulse of the laser light, and determines, when a linewidth of the spectrum in each of the range bins per pulse of the laser light is equal to or less than a predetermined threshold, that the range bin includes the signal derived from the hard target.

In the remote airflow observation device according to the present invention, the signal processor calculates a range bin in which the transmission light falls on ground serving as the hard target on the basis of information including an altitude from the ground of an aircraft on which the remote airflow observation device is mounted, and excludes, when accumulating a spectrum of a digital signal corresponding to the received signal in each of the range bins, accumulation of the spectrum of a range bin determined to include a signal derived from the ground and the spectrum of another range bin far from the range bin.

In the remote airflow observation device according to the present invention, the measurement unit acquires information of a true traveling direction of the aircraft, and includes a movable optical mirror or prism that corrects a relative angular difference between a current attitude and the transmission light. This makes it possible to eliminate the influence of irradiation on the ground or the like and to measure a wind speed in the same region between pulses.

In the remote airflow observation device according to the present invention, the signal processor determines, for each of the range bins per pulse of the laser light, whether an absolute value of a wind speed value calculated from the received signal in the range bin is equal to or less than a predetermined threshold, and determines, if the absolute value is equal to or less than a predetermined threshold, that the received signal of the range bin includes the signal derived from the hard target.

In the remote airflow observation device according to the present invention, the signal processor feeds back, per pulse of the laser light, a speed value of an aircraft on which the remote airflow observation device is mounted, to form a band-pass filter centered on the speed value, and performs filter processing using the band-pass filter on the received signal before being divided into the range bins. This makes it possible to suppress a strong reflected signal from the hard target and produce an effect capable of suppressing the saturation of an A/D converter.

In the remote airflow observation device according to the present invention, the signal processor calculates the wind speed value on the basis of the spectrum of the received signal obtained after signal values in a predetermined frequency region are set to zero at a first peak of the spectrum of the range bin determined to include the signal derived from the hard target and around the first peak. This makes it possible to eliminate reflected light from the ground or the like and also accumulate spectral signals containing atmospheric echoes, thus allowing observation without lowering the frame rate.

A remote airflow observation method according to the present invention includes: radiating transmission light including pulse-form laser light; receiving reflected light of the radiated transmission light as reception light; outputting a received signal for calculating a wind speed value on the basis of the transmission light and the reception light; distributing the received signal to range bins by time-dividing the received signal; and removing a signal derived from a hard target from the received signal.

A program according to the present invention is used for a remote airflow observation device including a measurement unit that radiates transmission light including pulse-form laser light, receives reflected light of the radiated transmission light as reception light, and outputs a received signal for calculating a wind speed value on the basis of the transmission light and the reception light, the program causing a computer to execute the steps of: distributing the received signal to range bins by time-dividing the received signal; and removing a signal derived from a hard target from the received signal.

Advantageous Effects of Invention

According to the present invention, it is possible to eliminate the influence of scattered waves from the ground or some object and to improve the reliability of airflow observation.

MODE(S) FOR CARRYING OUT THE INVENTION

Hereinafter, embodiments of the present invention will be described with reference to the drawings.

First Embodiment

Figure 1:
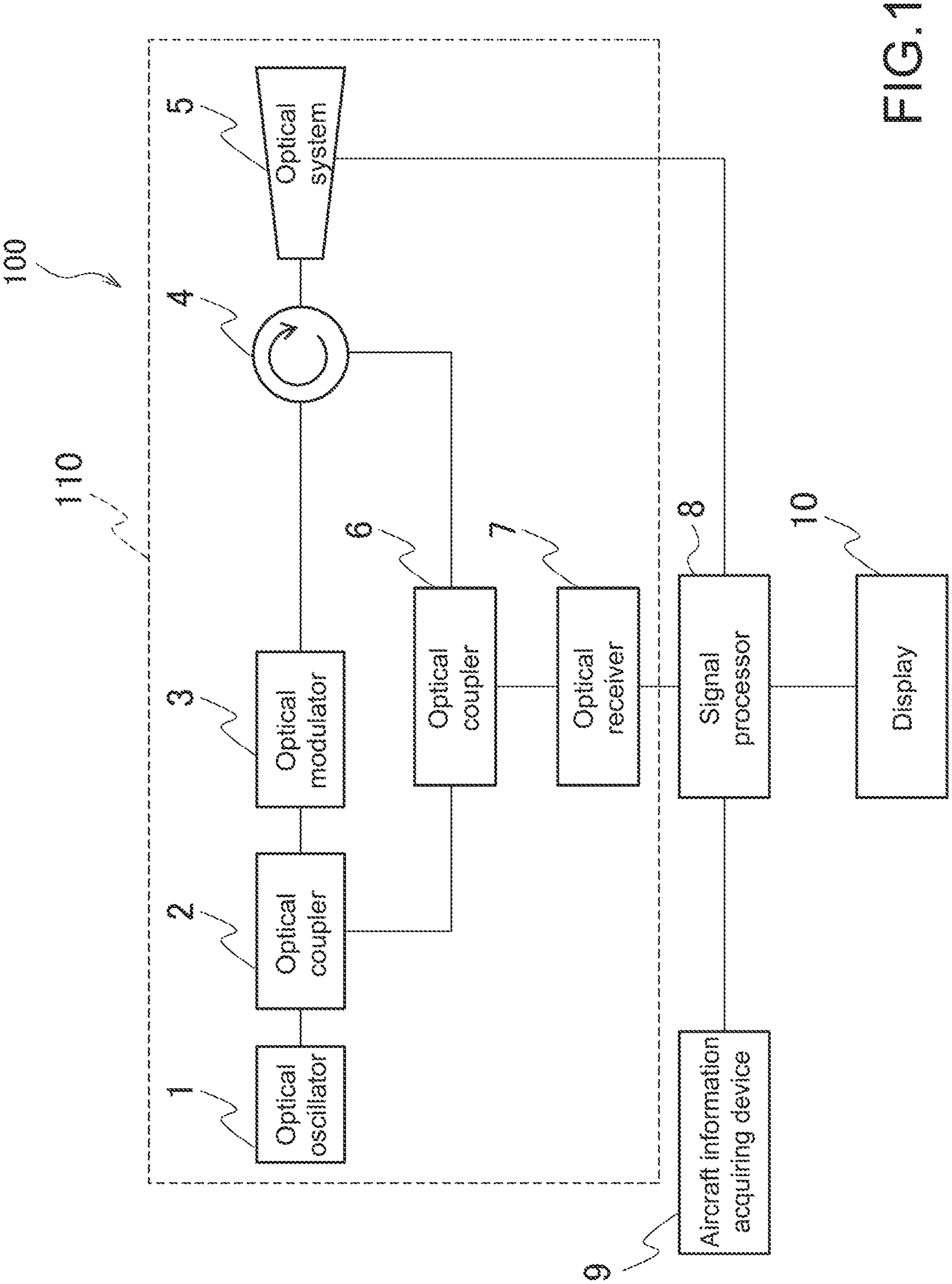
FIG. 1 is a block diagram showing a configuration of a Doppler Lidar according to a first embodiment of the present invention.

FIG. 1 is a block diagram showing the configuration of a Doppler Lidar according to a first embodiment of the present invention.

As shown in FIG. 1, a Doppler Lidar 100 includes a measurement unit 110, a signal processor 8, an aircraft information acquiring device 9, and a display 10.

Figure 2:
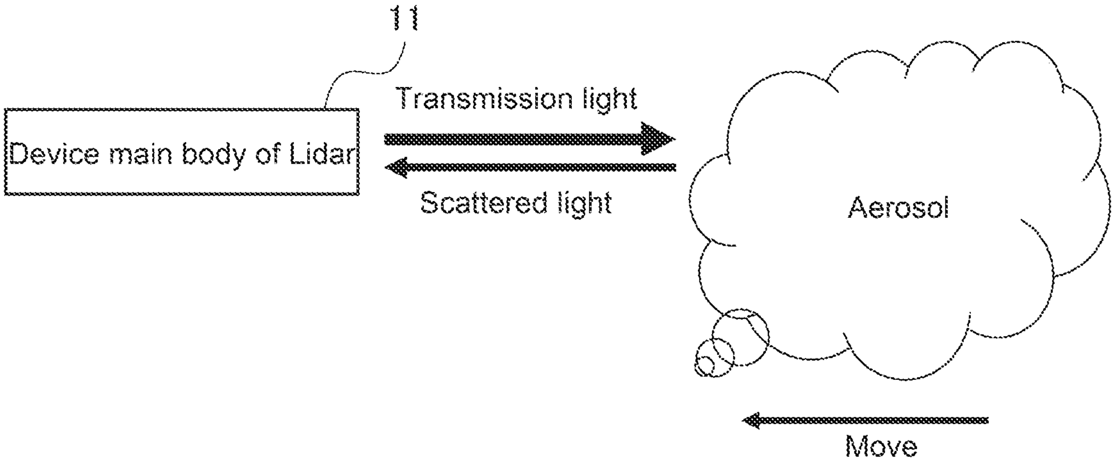
FIG. 2 is a diagram for describing the measurement principle of the Doppler Lidar, showing a state where the Doppler Lidar radiates transmission light to aerosol and receives reception light that is reflected light.

As shown in FIG. 2, the measurement unit 110 radiates transmission light including pulse-form laser light to the atmosphere, receives scattered light as reception light, the scattered light being reflected light of the radiated laser light from aerosol (moving by wind), and outputs a received signal for calculating a wind speed value by using the reception light.

Figure 3:
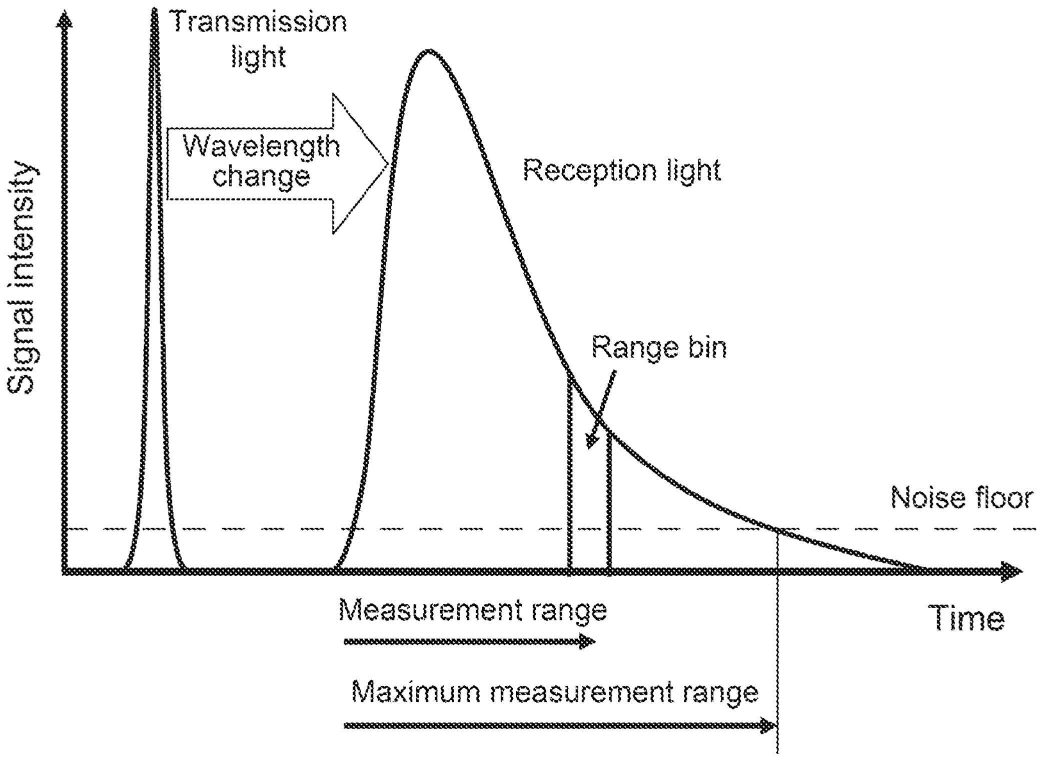
FIG. 3 is a diagram for describing the measurement principle of the Doppler Lidar, and is a graph showing the signal intensity of the transmission light and the reception light on a time axis.
Figure 4:
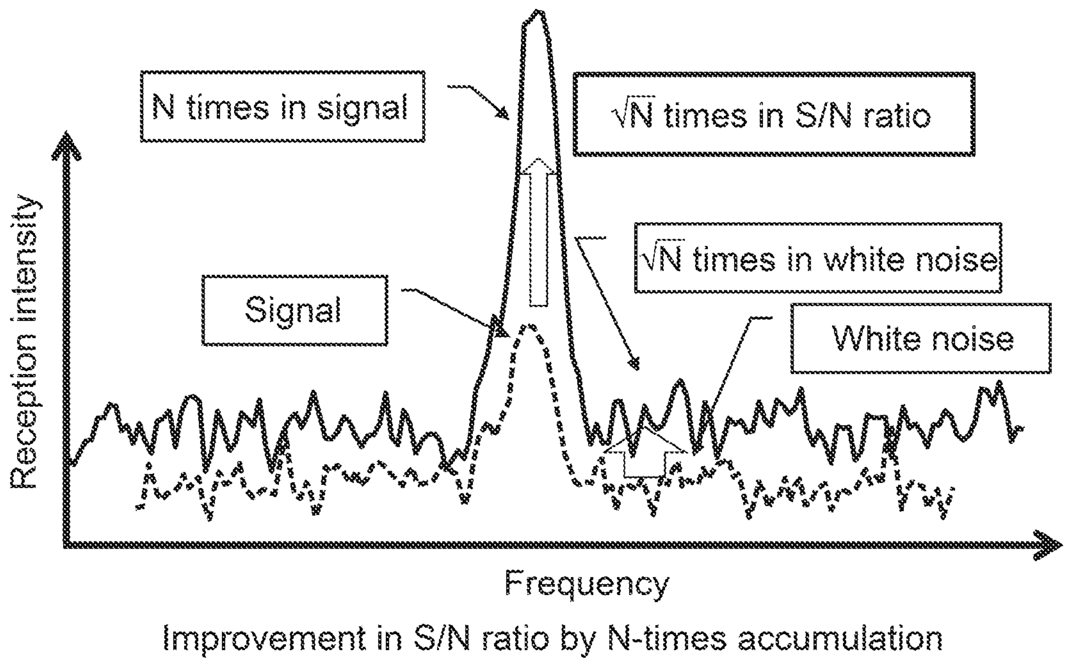
FIG. 4 is a diagram for describing an improved signal-to-noise (SN) ratio by N-times accumulation in the Doppler Lidar, and is a graph showing a relationship between the frequency and the signal intensity of a received signal.

As shown in FIG. 3, the signal processor 8 calculates a wind speed value by providing a time gate for a time-axis waveform of the received signal and performing spectral calculation within the gate. The gate is referred to as a range bin. Since the scattered light from aerosol is very small and its reflectivity is $10^{-6}$ orders of magnitude, the spectrum is subjected to incoherent accumulation a plurality of times as shown in FIG. 4, so that a signal-to-noise ratio (SNR) can be improved and detection can be performed. Note that, in terms of incoherent accumulation, the technique relating to the Lidar is clearly distinguished from the technique relating to the radar that performs coherent accumulation.

The measurement unit 110 shown in FIG. 1 includes an optical oscillator 1, an optical coupler 2, an optical modulator 3, an optical circulator 4, an optical system 5, an optical coupler 6, and an optical receiver 7.

The optical oscillator 1 is an optical oscillator that oscillates laser light, and is connected to the optical coupler 2 and outputs the oscillated laser light to the optical coupler 2. For example, a semiconductor laser, a solid-state laser, or the like is used for the optical oscillator 1.

The optical coupler 2 splits the laser light oscillated by the optical oscillator 1 into transmission light and local light, and outputs the transmission light to the optical modulator 3 and also outputs the local light to the optical receiver 7. The local light represents light that passes through a path leading to the optical receiver 7 through the optical coupler 2. The transmission light represents light that passes through a path leading to the optical system 5 through the optical modulator 3 from the optical coupler 2. The optical coupler 2 is connected to the optical oscillator 1, the optical modulator 3, and the optical coupler 6, outputs the local light to the optical coupler 6, and outputs the transmission light to the optical modulator 3. For example, a molten fiber coupler, a filter coupler using a dielectric multilayer film filter, or the like is used for the optical coupler 2.

The optical modulator 3 is a modulator that shifts the frequency of the transmission light output from the optical coupler 2. The transmission light is subjected to phase modulation or frequency modulation, and also converted into pulses. The optical modulator 3 is connected to the optical coupler 2 and the optical circulator 4. The optical modulator 3 includes an optical modulator such as an acousto-optic modulator (AOM), and pulse-modulates the transmission light output from the optical coupler 2 to output pulses.

The optical circulator 4 outputs the pulses output from the optical modulator 3 to the optical system 5, while outputting the reception light, which is the reflected light of the pulses received by the optical system 5, to the optical coupler 6. For example, a circulator configured using a wavelength plate and a beam splitter and being of a spatially propagating type or a fiber-coupled type is used for the optical circulator 4.

The optical system 5 radiates the pulses output from the optical circulator 4 to the atmosphere, and then receives reflected light of the pulses reflected and turned back by aerosol to be observed. The optical system 5 is connected to the optical circulator 4 and the signal processor 8. The optical system 5 includes a light-blocking shutter mechanism (illustration is omitted), and the signal processor 8 transmits an electric signal for releasing the shutter to the lens of the optical system 5. For example, an optical telescope or a camera lens is used for the optical system 5. Further, a mechanical shutter or an electronic shutter is used for the shutter. Although the shutter function for the optical system is described here, a configuration including a light-blocking mechanism in front of a sensor may be provided.

The optical coupler 6 combines the local light output from the optical coupler 2 and the reception light output from the optical circulator 4 with each other, and outputs an optical signal to the optical receiver 7. For example, a molten fiber coupler, a filter coupler using a dielectric multilayer film filter, or the like is used for the optical coupler 6.

The optical receiver 7 combines the local light output from the optical coupler 2 and the reception light output from the optical circulator 4 with each other at a coupler, and converts the combined light having a combined frequency of the frequency of the local light and the frequency of the reception light into an electric signal. In the electric signal conversion, for example, a balanced receiver is used to convert the combined light output from the coupler into an electric signal, and the electric signal is output to the signal processor 8.

The signal processor 8 analyzes an electric signal corresponding to an aircraft speed input from the aircraft information acquiring device 9 and the received electric signal output from the optical receiver 7 and thus calculates a wind speed, which is the moving speed of aerosol.

Figure 5:
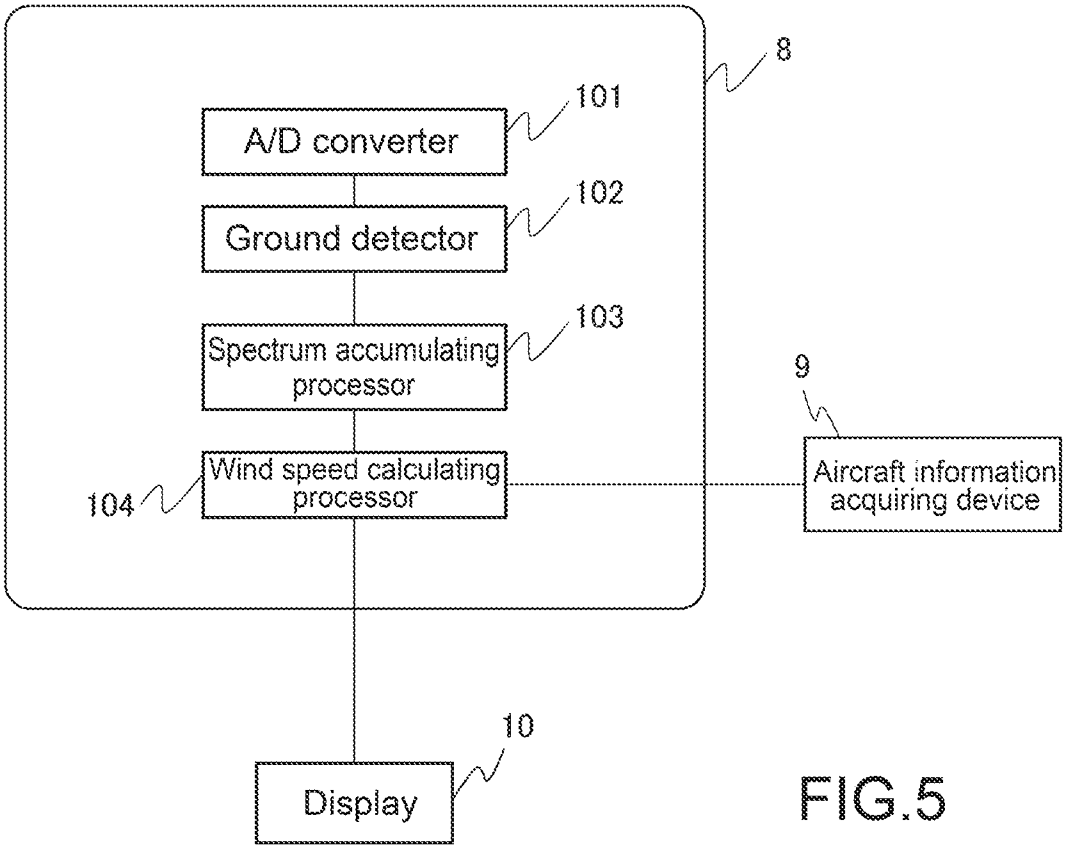
FIG. 5 is a block diagram showing the configuration of a signal processor according to the first embodiment of the present invention.

FIG. 5 is a block diagram showing the configuration of the signal processor 8 of the Doppler Lidar 100 according to the first embodiment.

As shown in FIG. 5, the signal processor 8 includes an A/D converter 101, a ground detector 102, a spectrum accumulating processor 103, and a wind speed calculating processor 104.

The A/D converter 101 is an analog-to-digital converter that converts the received electric signal output from the optical receiver 7 into a digital signal. The A/D converter 101 outputs the digitally converted signal to the ground detector 102.

The ground detector 102 time-divides time-series data of the obtained digital signal, and after dividing the data into data for each range bin, performs FFT processing thereon to obtain a spectrum, searches for a range bin having a predetermined threshold or larger from the farthest range bin, and outputs an electric signal corresponding to an "accumulation flag" for determining whether it is to be accumulated or excluded for each range bin to the spectrum accumulating processor 103 and also outputs the calculated spectrum of each range bin to the spectrum accumulating processor 103.

The spectrum accumulating processor 103 accumulates or excludes the spectrum in accordance with the accumulation flag obtained from the ground detector 102, and outputs an electric signal corresponding to the spectrum accumulated a prescribed number of times to the wind speed calculating processor 104.

The wind speed calculating processor 104 inputs a spectral signal output from the spectrum accumulating processor 103 and ground speed information output from the aircraft information acquiring device 9, derives a Doppler shift amount corresponding to the speed from the peak of the spectrum, and outputs a wind speed value obtained by subtracting the aircraft speed therefrom to the display 10. In this embodiment, each unit can be configured by dedicated hardware. Examples of the dedicated hardware include a semiconductor integrated circuit on which a CPU is mounted, and a one-chip microcomputer. However, the signal processor 8 may be configured by software installed on the computer.

The aircraft information acquiring device 9 shown in FIGS. 1 and 5 includes an inertial navigation system (INS) including a gyroscopic sensor or an acceleration sensor, a radio altimeter such as a GPS receiver capable of acquiring radio wave information, and a barometric altimeter that estimates an altitude from an atmospheric pressure, and outputs an electric signal corresponding to the aircraft speed, the altitude, and the attitude of the aircraft (roll, pitch, yaw) to the signal processor 8.

The display 10 shown in FIGS. 1 and 5 is a display that displays a line-of-sight-direction wind speed value calculated by the signal processor 8. The display 10 is connected to the signal processor 8. The display 10 displays the data calculated by the signal processor 8, for example, the line-of-sight-direction wind speed value and the SNR thereof. For example, a liquid crystal display, an organic electro luminescence (EL) display, or the like is used for the display 10. The display 10 may include a storage device such as a random access memory (RAM) or a hard disk and may store the line-of-sight-direction wind speed value and the SNR thereof with respect to the time.

Next, the operation of the Doppler Lidar 100 according to the first embodiment will be described.

First, the optical oscillator 1 oscillates laser light, and the optical coupler 2 splits the corresponding light into two beams. One light beam split by the optical coupler 2 is output to the corresponding optical modulator 3, and the other light beam is output to the optical coupler 6.

Next, the optical modulator 3 changes a modulation frequency and performs pulse modulation on the laser light from the corresponding optical coupler 2.

The modulated laser light is emitted into the atmosphere through the optical circulator 4 and the optical system 5. The laser light serving as scattered light scattered by aerosol (dust) in the atmosphere is received through the optical system 5 and the optical circulator 4.

The received laser light is combined with the local light at the optical coupler 6, subjected to heterodyne detection at the optical receiver 7, and converted into an electric signal. A beat signal detected by the optical receiver 7 is output to the signal processor 8.

Next, the signal processor 8 calculates a wind speed value in a line-of-sight direction from the aircraft speed obtained from the aircraft information acquiring device 9 and the beat signal from the optical receiver 7, and outputs the wind speed value to the display 10.

Hereinafter, the operation of the signal processor 8 will be described.

When receiving the electric signal from the optical receiver 7, the A/D converter 101 of the signal processor 8 converts the electric signal to a digital signal.

Figure 6:
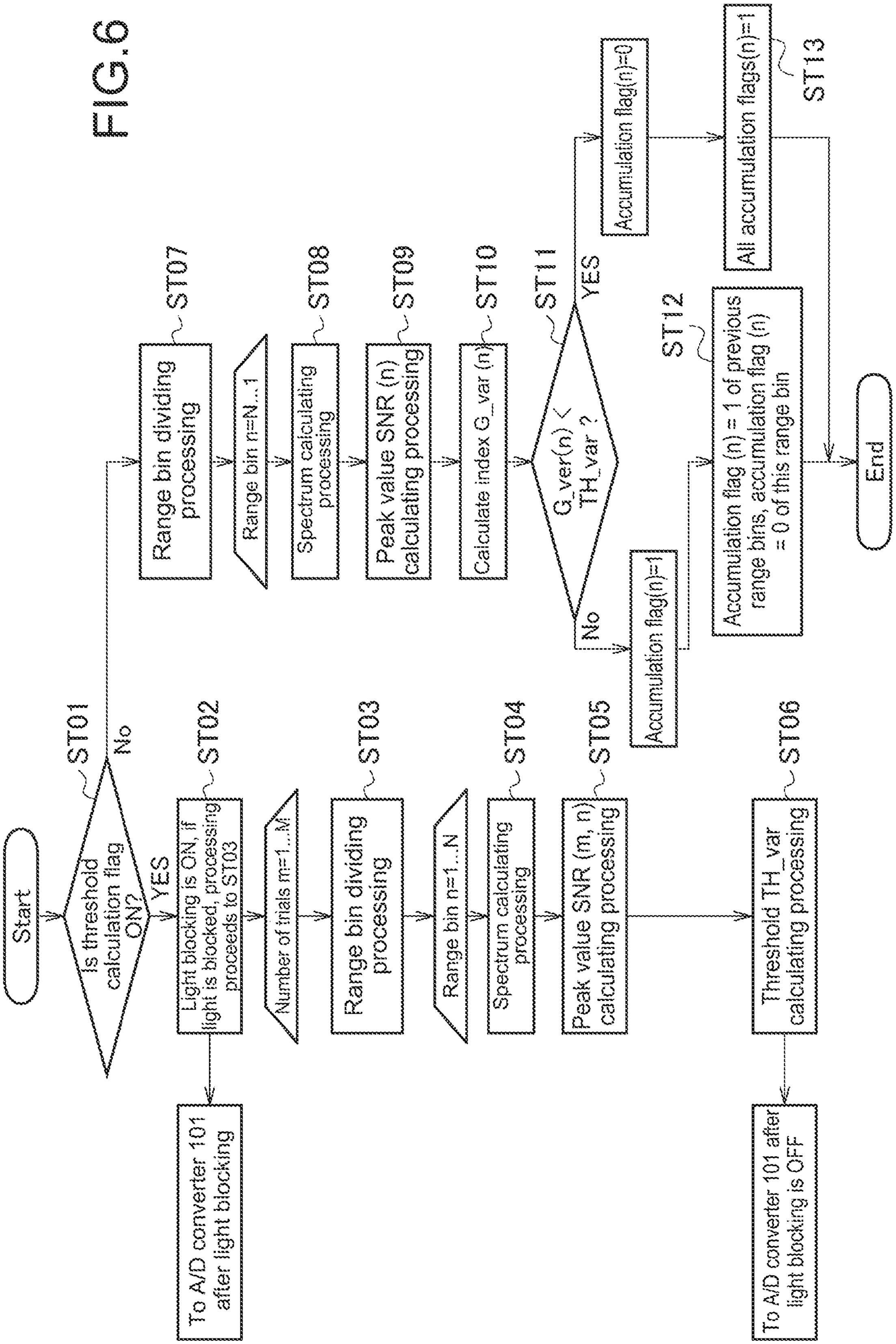
FIG. 6 is a flowchart showing the operation of the signal processor according to the first embodiment of the present invention.

The processing contents of the ground detector 102 are shown in the flowchart of FIG. 6. At the same time, FIG. 7 shows a schematic signal at that time.

In FIG. 6, if a threshold calculation flag is OFF in ST01, the processing proceeds to the flow ST07 for deriving an accumulation flag to be described later. If a threshold calculation flag is ON, the following processing is performed. Here, in the ground detector 102, a threshold $TH_{var}$ of the accumulation flag for determining whether to perform incoherent accumulation on the signal or not can be set to a predetermined value. The threshold calculation flag is a flag for determining whether to execute such threshold setting processing (ON) or not (OFF).

In ST02, an electric signal for blocking light is transmitted to the optical system 5, and after performing the light blocking, a digital signal is obtained in the A/D converter 101 again in a light blocking state. The obtained electric signal is time-divided and divided into a plurality of range bins (ST03 and FIG. 7(*a*)).

Figure 7:
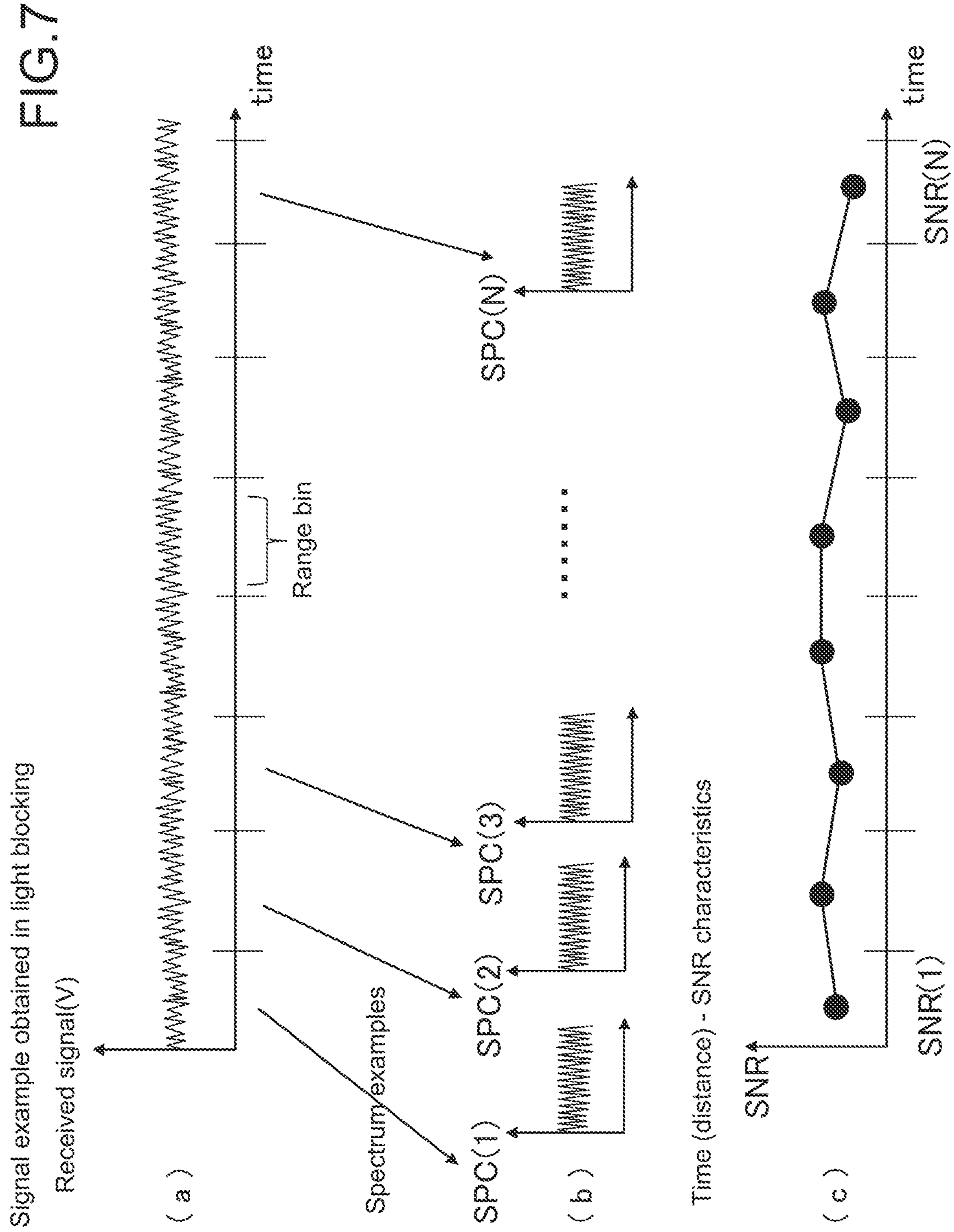
FIG. 7 is a simulation diagram of a received signal and a detection example obtained at the time of light blocking in the signal processor according to the first embodiment of the present invention.

In spectrum calculating processing ST04, the electric signal divided into range bins is provided with a value of zero (zero padding) so as to obtain a preset number of data, subjected to FFT processing, and converted into spectra (SPC(1) to SPC(N)) for the respective range bins (FIG. 7(*b*)). The peak of each obtained spectrum is detected, and the peak value thereof is defined as SNR(N). N represents a range bin number. This is repeated M times as the number of trials to obtain the data of a spectral peak value SNR(N, M) at the time of light blocking (FIG. 7(*c*)). N represents a maximum value of the range bin, and M represents a natural number. Finally, the threshold $TH_{var}$ is calculated. The threshold $TH_{var}$ is obtained by the following equation, for example, and is defined as a combination of an offset and a standard deviation.

$$TH_{var} = \text{mean}\ (SNR) + A \times std(SNR) \tag{1}$$

"SNR" in Equation (1) represents the SNR values of all the range bins, "mean" represents a mean, and "std" represents a standard deviation. "A" is a coefficient representing a detection probability. If a detection probability of 99% or more is desired to be achieved, a value such as 3.3 is input. An index for evaluating the offset of noise by using the mean and evaluating the variations thereof by using the standard deviation is set, so that it is possible to detect the offset fluctuation due to signal saturation or the like and also an increase in mechanical noise due to heat or the like. Therefore, there is an advantage that it is possible to evaluate an abnormal state of the device and also the reliability of signals as well as detecting the ground. After such processing, the threshold calculation flag is turned OFF, an electric signal for stopping the light blocking is transmitted to the optical system 5 to stop the light blocking, and the processing returns to the processing of the A/D converter 101. The threshold calculation flag may be a dynamic set value by a user or may be acquired once every three hours by using a timer, for example.

If the threshold calculation flag is OFF in ST01, the processing proceeds to the processing of ST07. The range bin dividing processing ST07 performs the same processing as ST03. The spectrum calculating processing ST08 performs the same processing as ST04. The peak-value SNR calculating processing ST09 performs the same processing as ST05.

Figure 8:
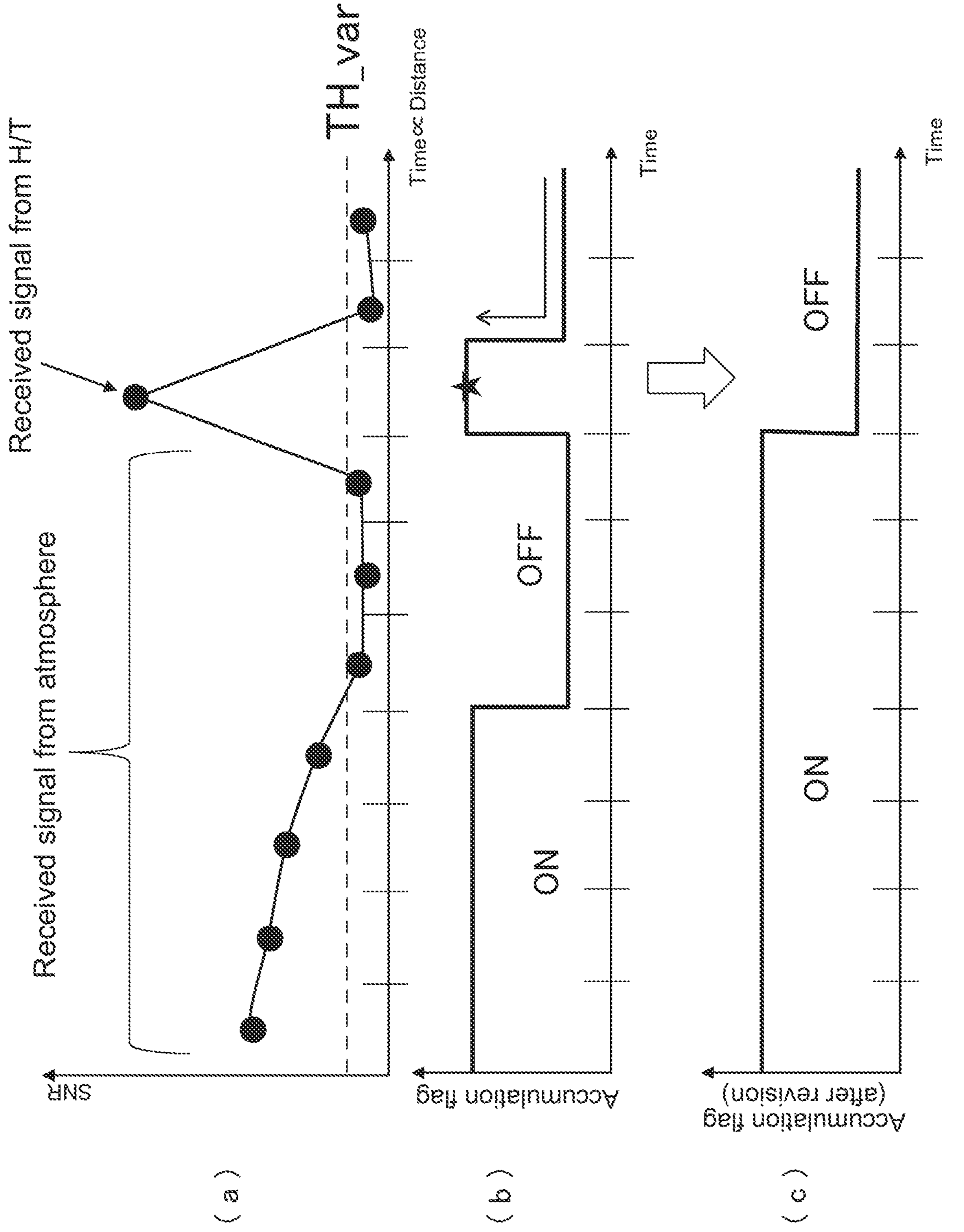
FIG. 8 is a simulation diagram of a received signal and a detection example obtained at the time of observation in the signal processor according to the first embodiment of the present invention.

The SNRs of the respective range bins obtained after the processing of ST07 are determined using the threshold $TH_{var}$ (ST11). FIG. 8 shows a schematic signal at that time. FIG. 8(*a*) shows the time (distance) characteristics of the obtained SNRs, simulating a case where there is reflection from a hard target (H/T) such as the ground at any distance. Meanwhile, FIG. 8(*b*) shows the results of the above determination. The received signal from the atmosphere depends on the environment, and sometimes exceeds the threshold. The same figure simulates such a situation (e.g., "ON" on the left side of FIG. 8(*b*)). In the determination of ST11, the determination is performed from the farthest range bin N, i.e., the farthest point as indicated by the arrow in FIG. 8(*b*), and a point at which the accumulation flag is turned ON (1) (star mark in FIG. 8(*b*)) first is searched for. This point is determined to be reflection from the H/T.

This determination uses the following feature: light is not penetrated beyond the H/T and only a noise signal is obtained at farther range bins. The determination is performed from the farthest point, which produces the effect of reducing an erroneous detection.

Next, in ST12, the accumulation flags of range bins farther than the range bin in which the detected H/T exists are set to OFF (0), and the processing is terminated. FIG. 8(*c*) shows a simulated signal at that time.

On the other hand, if all the accumulation flags are OFF (0) in all the range bins, it is determined that the ground is not irradiated, and the accumulation flags of the respective range bins are output as ON (1) (ST13).

If the accumulation flag is ON, the spectrum accumulating processor 103 accumulates the spectral signal. If the accumulation flag is OFF, the spectrum accumulating processor 103 determines that it is a signal from the ground or a noise signal in which signal components do not exist, and does not perform the accumulation processing. After performing a prescribed number of observations, the spectrum accumulating processor 103 performs division by the number of spectra accumulated and then performs normalization. Since this is performed on each range bin, the values to be divided differ depending on the range bins. By not only removing the range bin of the ground only but also performing no accumulation processing in the range bins in which the signal components do not exist, the effect of improving the SNR is ensured. This effect of improving the SNR is obtained by accumulation when the amounts of signal and noise are constant, as described above. However, there is a problem that the SNR decreases conversely when only noise in which signals are not mixed is accumulated. There is an advantage that such a problem can be reduced by performing this processing.

In the wind speed calculating processor 104, a line-of-sight-direction wind speed value Vlos of the n-th range bin is calculated by the following equation using p as a peak spectral bin number of the accumulated spectrum, fs as a sampling frequency, λ as a wavelength, and $N_{FFT}$ as the number of data points used for FFT processing.

$$Vlos(n) = \lambda \times \{(p(n) - 1) \times fs / N_{FFT} - IF)\} / 2 - V_{vehicle} \quad (2)$$

IF represents the center frequency, and $V_{vehicle}$ represents the speed of the aircraft. For such information, the speed information obtained from the aircraft information acquiring device 9 is used.

In the display 105, the obtained line-of-sight-direction wind speed value Vlos of each distance or the intensity value of the spectral peak value obtained in ST09 or the like are displayed.

The Doppler Lidar 100 according to the first embodiment of the present invention is suitable for a laser radar device that uses an index (threshold $TH_{var}$) using a mean value and a standard deviation of spectral intensity acquired in advance and performs H/T detection determination using the index from the farthest distance, thus allowing improvement in the efficiency of signal accumulation while reducing erroneous detection, and performing a robust wind measurement in an aircraft.

In the embodiment described above, the detection using a spectral peak is performed after performing FFT. Such detection may use the amplitude value of a time signal as an alternative. In this case, it is unnecessary to perform FFT processing for the determination, which provides an advantage that the computer cost can be reduced.

Second Embodiment

In the above first embodiment, the threshold determination for the spectral intensity value is performed at the ground detector 102 of the signal processor 8, and then, the ground is detected from the distance fluctuation with respect to the determination result. In a second embodiment, ground detection is performed by using the ratio of neighboring spectral intensities.

Figure 9:
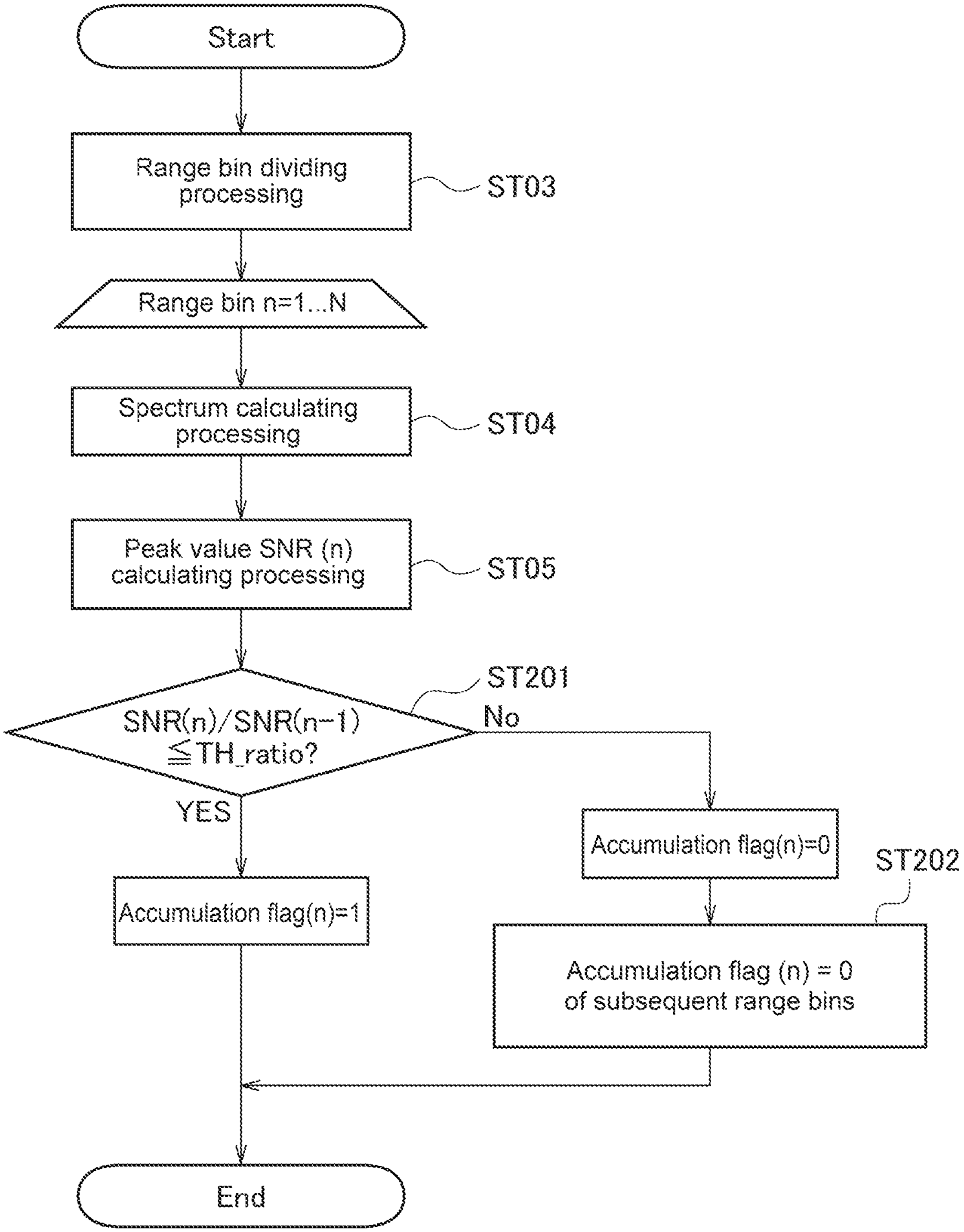
FIG. 9 is a flowchart showing the operation of a signal processor according to a second embodiment of the present invention.
Figure 10:
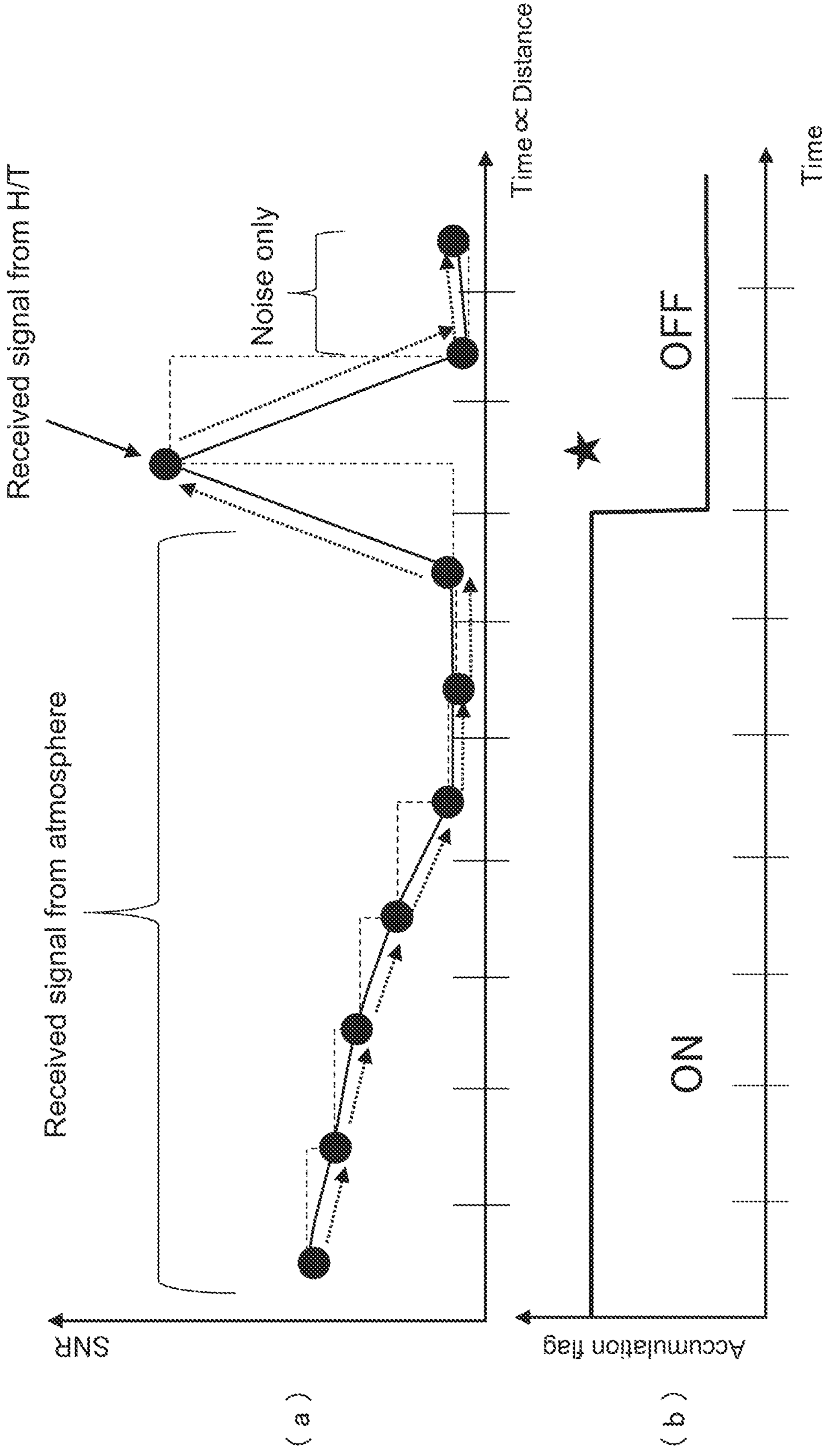
FIG. 10 is a simulation diagram of a received signal and a detection example obtained at the time of observation in the signal processor according to the second embodiment of the present invention.

FIG. 9 is a flowchart showing the processing contents of a ground detector 102 of a signal processor 8 according to the second embodiment of the present invention. Further, FIG. 10 shows its conceptual diagram.

In the signal processor 8 according to the second embodiment, similarly to the above first embodiment, the received signal, which has been A/D-converted, is time-divided in the range bin dividing processing ST03 to section the time-series waveform into range bins. In the spectrum calculating processing ST04, FFT processing is performed on the respective range bins. In the peak value SNR calculating processing ST05, the spectral peak value is extracted as SNR(n).

Next, in the ground detector 102 of the signal processor 8, the ratio of the peak values of neighboring range bins (SNR(n)/SNR(n−1)) is taken in ST05, and thresholding is performed thereon (ST201). In other words, in ST201, it is determined whether $SNR(n)/SNR(n-1) \le$ threshold $TH_{ratio}$.

The threshold $TH_{ratio}$ may be determined by the ratio of the reflectance from the H/T to a backscatter coefficient, which are theoretically determined, according to Equation (3). $R_{HT}$ represents the reflectance of a target. For example, a value of 0.1% or the like is used for black asphalt. For the backscatter coefficient β, an average backscatter coefficient of the land may be input and set as a threshold, or the backscatter coefficient may be changed as needed in accordance with weather or the like. The present invention is not limited to the above.

$$TH_{ratio} = (R_{HT}/\pi)\beta \tag{3}$$

As shown in FIG. 10, when the received signal from the H/T is obtained, a large fluctuation is obtained with respect to the atmosphere (see FIG. 10(*a*)). If the peak ratio is equal to or less than the threshold, it is assumed to be the atmospheric fluctuation, and the accumulation flag is set to ON (1). On the other hand, if the peak ratio is not equal to or less than the threshold, it is assumed that a strong signal is obtained from any point, that is, reflection from the ground is obtained, and the accumulation flag is set to OFF (0) and the accumulation flags of the subsequent range bins including that range bin are set to OFF (see FIG. 10(*b*)). As shown in FIG. 10(*b*), the accumulation flags after the star mark located on the range bin in which the received signal from the H/T is obtained are set to OFF (ST202).

Hereinafter, similarly to the above first embodiment, the accumulation processing is performed using the above accumulation flag.

Note that, in the second embodiment, light blocking or a shutter mechanism is not required. However, in order to perform highly accurate detection, the spectrum at the time of light blocking is subtracted from the obtained spectrum, thus allowing ground detection that is not affected by colored noise.

Third Embodiment

In the above first embodiment, after the received time-series signal is divided into range bins, it is determined whether to perform accumulation on each of the range bins or not. In a third embodiment, a detection window that differs from the range bin is formed, and determination is performed within the window. Subsequently, only the time-series data in which the H/T is mixed is deleted to form time-series data including only an atmosphere signal, FFT processing is performed thereon, and accumulation is performed. This allows the data rate and the SNR to be made relatively uniform without discarding useful data.

Figure 11:
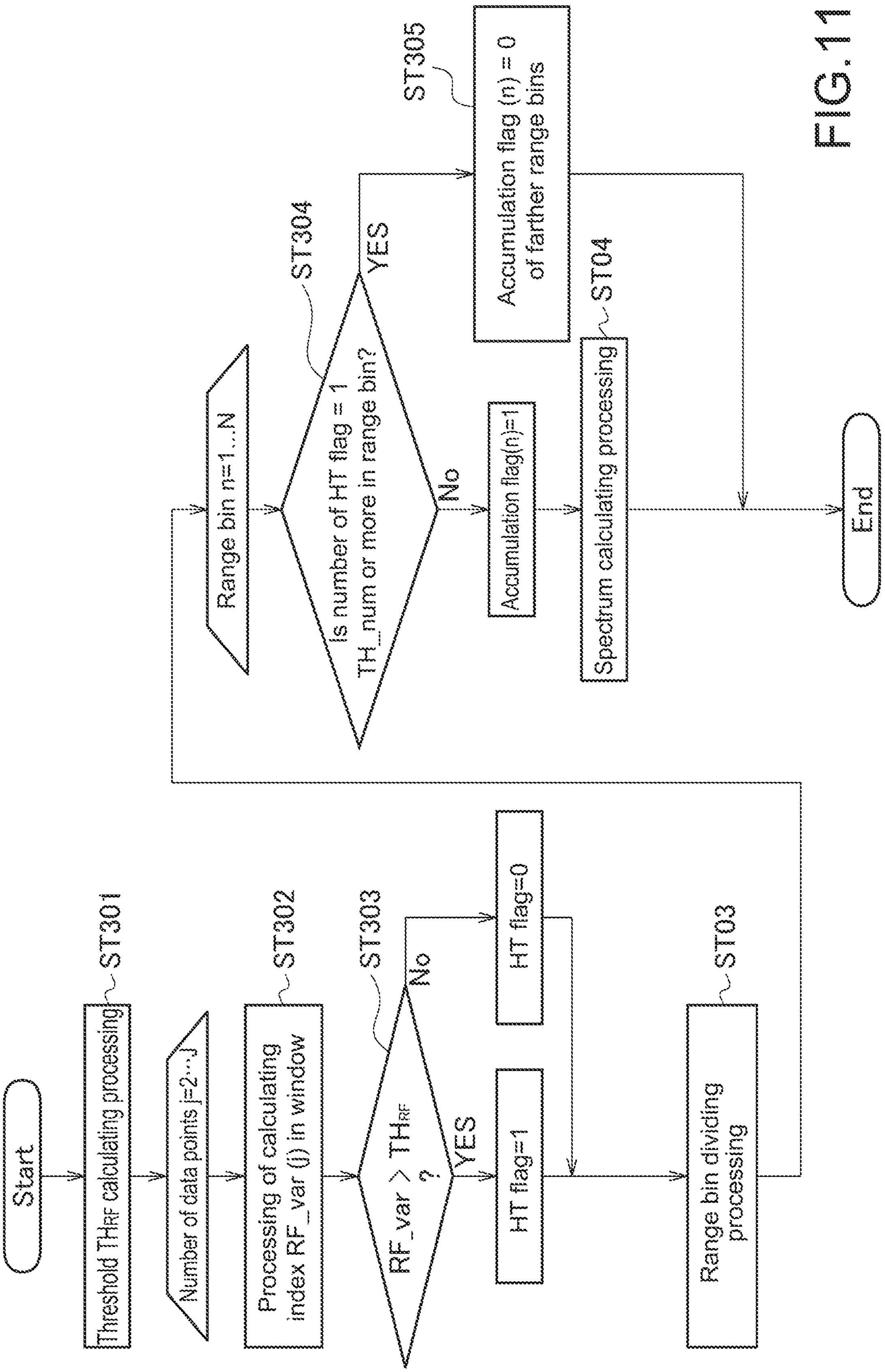
FIG. 11 is a flowchart showing the operation of a signal processor according to a third embodiment of the present invention.
Figure 12:
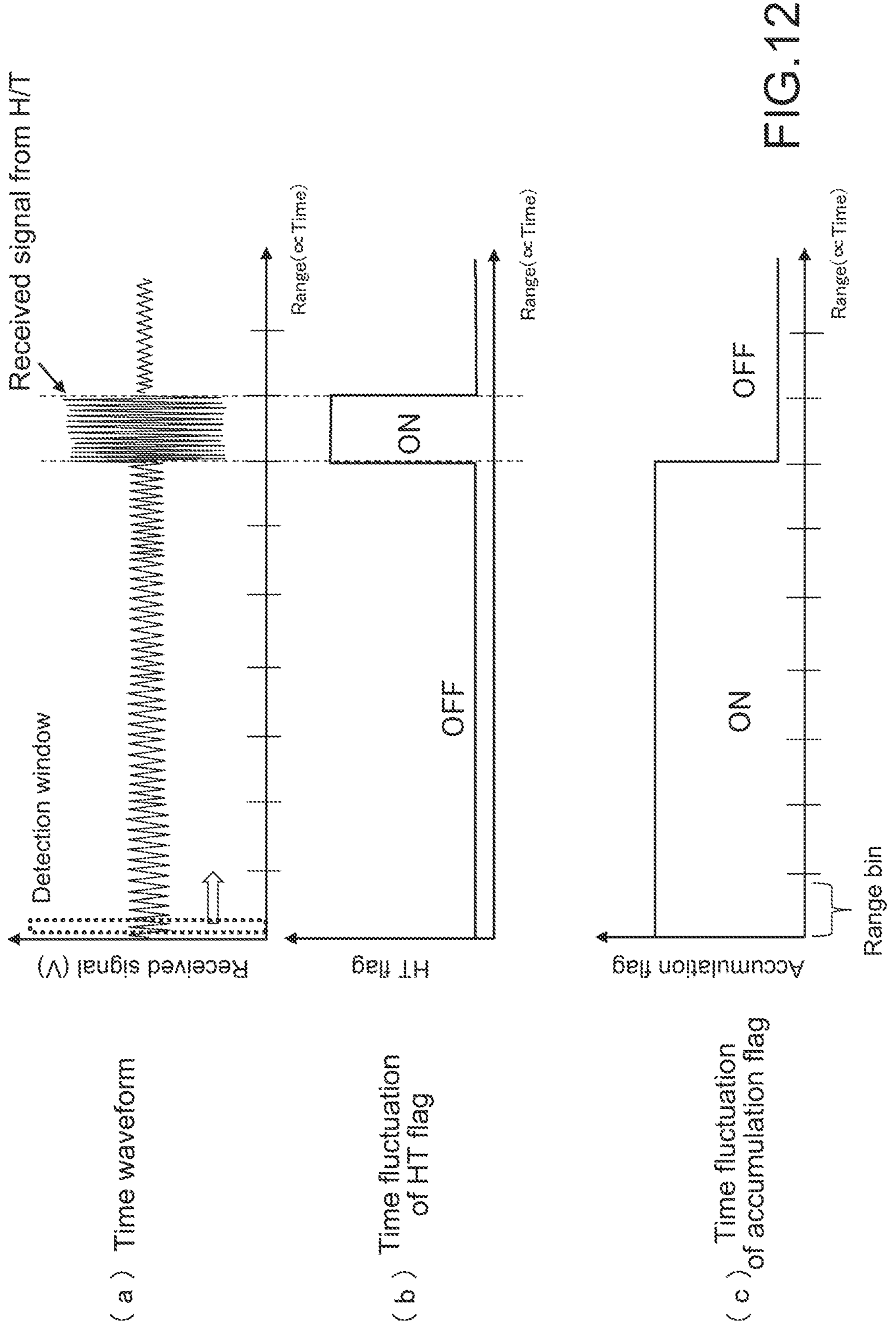
FIG. 12 is a simulation diagram of a received signal and a detection example obtained at the time of observation in the signal processor according to the third embodiment of the present invention.

The operation of a ground detector 102 of a signal processor 8 in the third embodiment will be described below. FIG. 11 is a flowchart showing the processing contents, and FIG. 12 is a simulation diagram showing the processing contents.

First, the ground detector 102 sets a detection window for a digital signal acquired from an A/D converter 101. The width of the window is set such that the number of waves of the obtained digital waveform is 1 or more. For example, the width of the window is set such that a Doppler frequency fd/fs corresponding to the speed to be detected is 1 or more. On the other hand, it may be equivalent to a range bin so as to stably perform detection, and the present invention is not limited thereto.

In ST301, assuming that a data number of the digital signal is set to j=1 . . . J, and the window size is set to Wwin in the set detection window, a threshold $TH_{RF}$ is calculated as follows for a digital signal V of a data number 1 . . . Wwin.

$$TH_{RF} = \sqrt{\frac{\sum_{j=1}^{W_{win}} V(j)^2}{W_{win}}} \times \alpha_{RF} \tag{4}$$

where $\alpha_{RF}$ represents a coefficient, and a value of 2.0 or the like is input thereto. Here, the index is a root mean square (RMS), but it may be the maximum value or a standard deviation, and the present invention is not limited thereto. Further, although the first data is used for threshold creation, any position may be used as a reference, and the present invention is not limited thereto. In general, in the distance characteristics of the laser radar, the received intensity value decreases by a square with respect to the distance if a converging position of the optical system is infinite. On the other hand, in consideration of a case where the optical system is not infinite, the converging position of the optical system may be set in the threshold creation.

Next, detection is performed on the number of data points 2 to (Wwin+1), i.e., while shifting the window.

In ST302, an index RF_var for detecting the H/T of each data number is calculated for the shifted window (see FIG. 12(*a*)) using the following equation.

$$\text{RF\_var}(j) = \sqrt{\frac{\sum_{j=2}^{W_{win}} V(j)^2}{W_{win}}} \tag{5}$$

In ST303, the index RF_var and the threshold $TH_{RF}$ are compared with each other to perform determination on each data number. If the index RF_var is larger than the threshold $TH_{RF}$, the H/T is assumed, and the HT flag is set to ON (1). If not, the HT flag is set to OFF (0). As a result, the HT flag is generated for each data (see FIG. 12(*b*)).

After completion of the processing, the range bin dividing processing ST03 described above is similarly performed. After the data is time-divided, it is determined on the data in each range bin whether the number of HT flags of ON (1) is the number of thresholds TH_num or more in ST304.

This is performed to suppress a sharp fluctuation and allow stable detection. Although the number of pieces is used here, an index such as a percentage may be used. If the HT flag of ON (1) is present in number equal to or more than the number of thresholds TH_num, the accumulation flag is set to ON. If not, the accumulation flag is set to OFF on the assumption that all subsequent range bins including the currently determined range bin includes only a noise signal at the H/T or beyond the H/T (see FIG. 12(*c*)).

Figure 13:
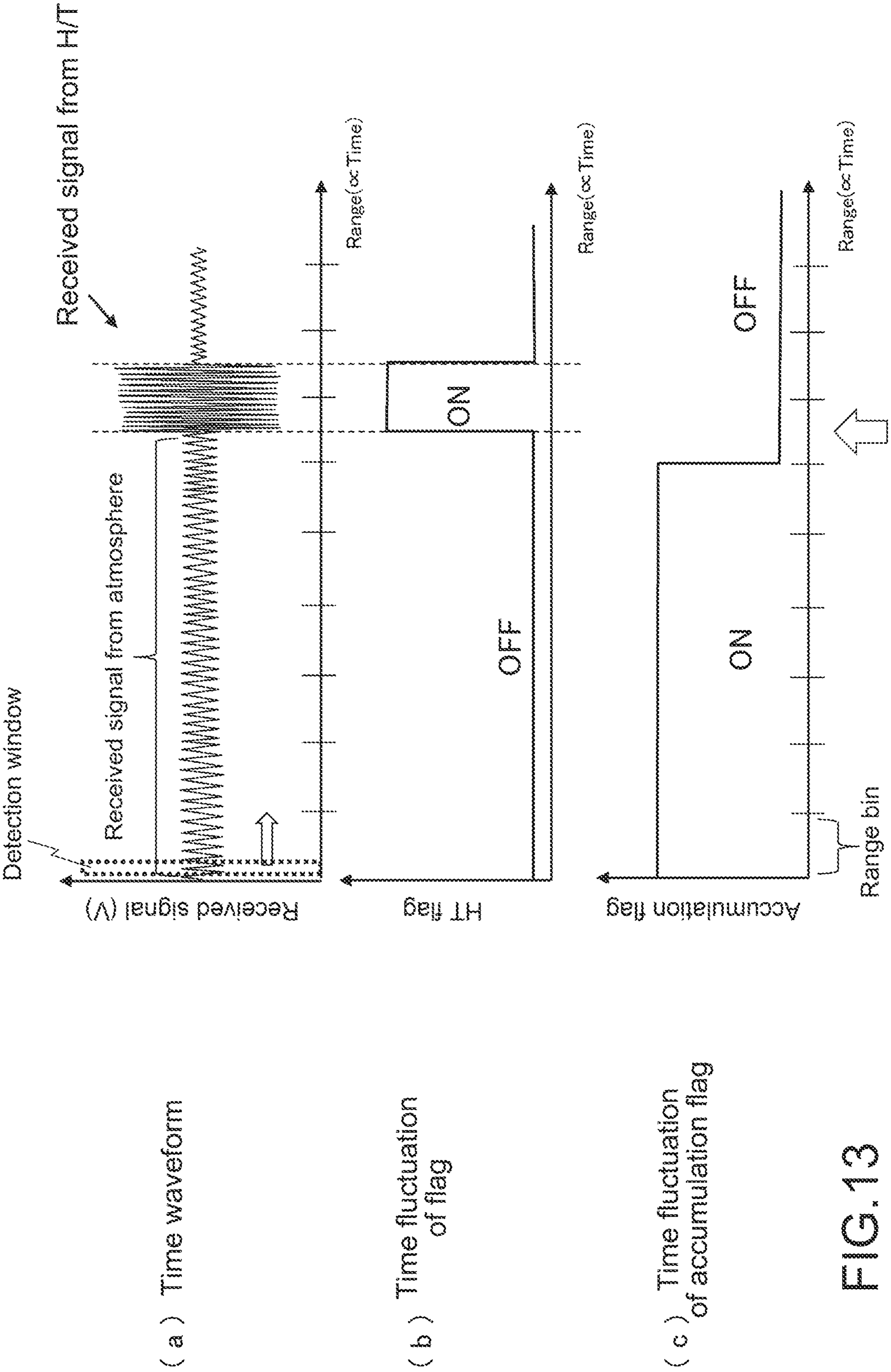
FIG. 13 is a simulation diagram of a detection example when a reflected signal of the ground falls within range bins in the signal processor according to the third embodiment of the present invention.

FIG. 13 is a diagram simulating the influence when the received signal from the H/T falls within range bins. If the number of such range bins is equal to or larger than the threshold, the accumulation flag is OFF. Wind speed estimation using signals other than the atmosphere signal becomes a factor that deteriorates estimation accuracy, and thus has the merit of improving the accuracy of wind speed measurement. Hereinafter, similarly to the above first and second embodiments, the processing using the spectrum accumulating processor, the wind speed calculating processor, and the display will be performed. Note that the method of shifting the window by one data point has been described in the above description, but the window may be shifted by one window width so as to reduce the computer cost, and the present invention is not limited thereto.

As a modification of this embodiment, in the threshold $TH_{RF}$ calculating processing in ST301 and the processing of calculating the index RF_var in the window in ST302, the index may be set as follows. By using an instantaneous phase value as will be shown below, an index including frequency fluctuation and signal intensity is created to improve the accuracy of ground detection.

Figure 14:
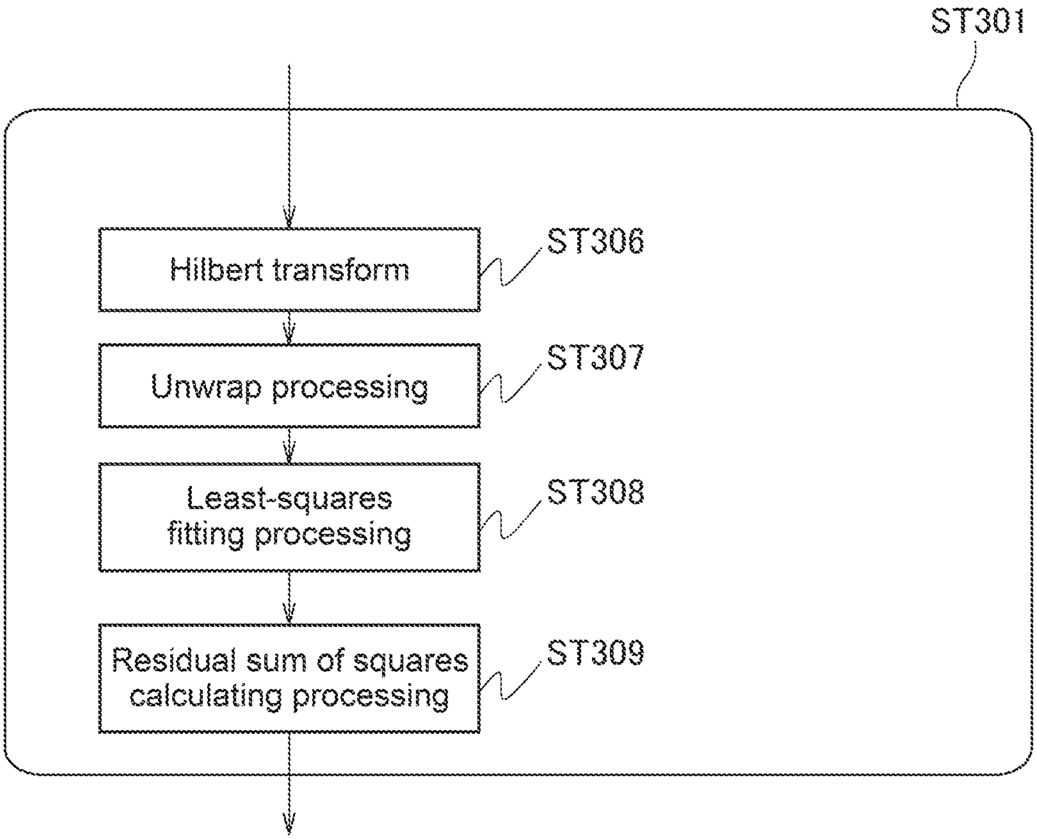
FIG. 14 is a flowchart showing the operation of a signal processor according to a modification of the third embodiment of the present invention.

FIG. 14 is a flowchart of the processing contents of ST301 in this modification.

In the same manner as in the above embodiment, a detection window is provided, a Hilbert transform is performed on the received signal in that window (ST306), and an instantaneous phase is derived as shown in the following equation (see FIG. 15(*a*)).

$$\text{phase }(j) = \text{angle }(\text{hilbert }(V(j))) \tag{6}$$

Figure 15:
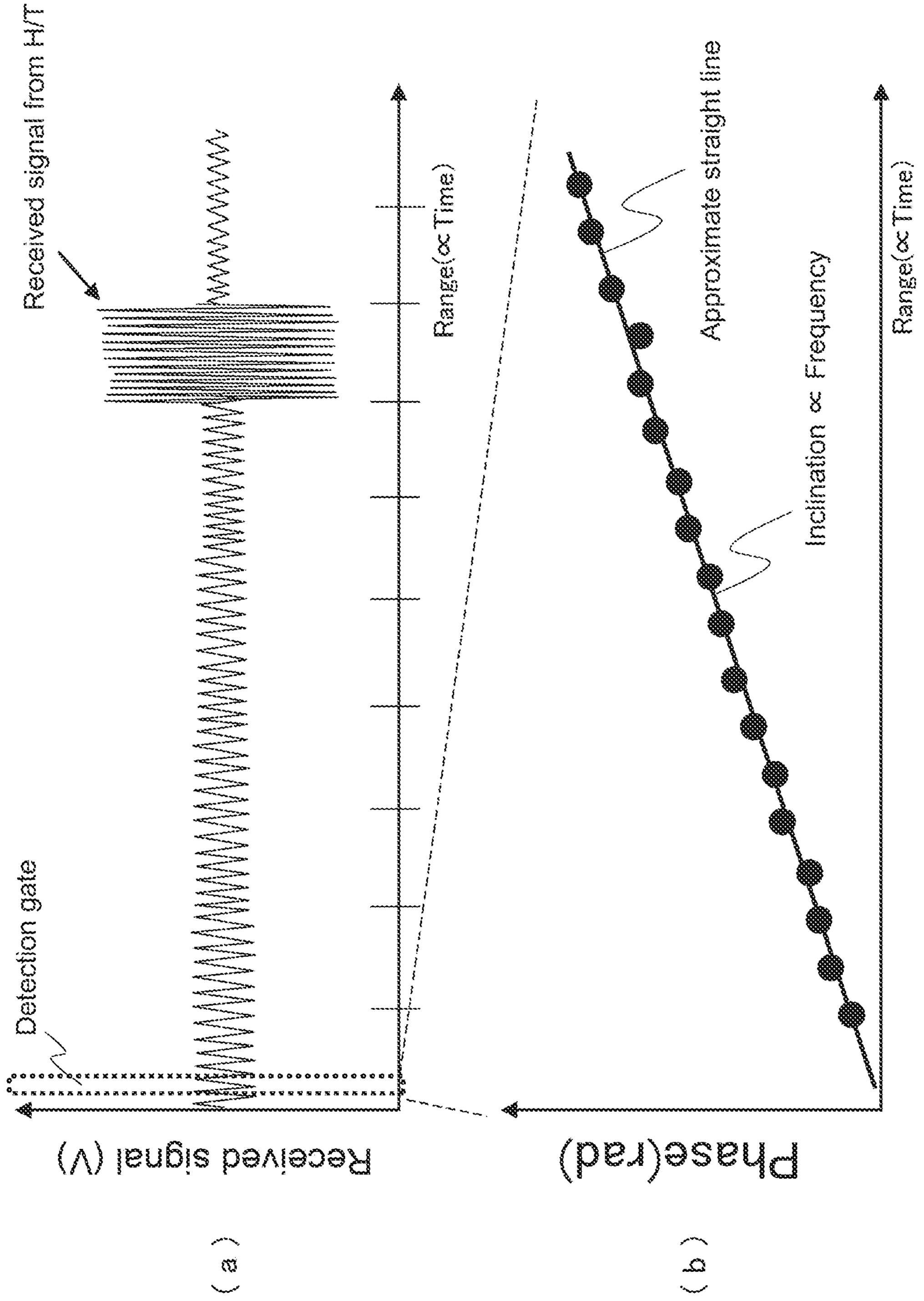
FIG. 15 is a simulation diagram of a received signal and a detection example obtained at the time of observation in the signal processor according to the modification of the third embodiment of the present invention.

Next, unwrap processing to connect the phases is performed to make the phase rotation smoother (see ST307, FIG. 15(*b*)).

$$\text{phase}'(j) = \text{unwrap }(\text{phase }(j)) \tag{7}$$

The least squares approximation is performed on the unwrapped point clouds phase'(j) (ST308), and a first-order approximate straight line f(t)=ax+b is derived (see FIG. 15(*b*)). The inclination of the obtained approximate straight line corresponds to the frequency of the received signal (cc Doppler velocity) and is obtained by the following equation. fs represents a sampling frequency.

$$fr = a \times fs / 2\pi$$

Here, using the difference between the data points with respect to the least-squares approximate straight line as $f_{error}$ and using a root mean square error (RMSE), the index $RF_{var}$ is calculated as follows.

$$RF_{var} = \sqrt{\frac{1}{W_{win}} \sum f_{error}(i)^2} \tag{8}$$

Further, similarly as described above, a value being $\alpha_{RF}$ times as large as $RF_{var}$ of the nearest window is set as the threshold $TH_{RF}$.

Figure 16:
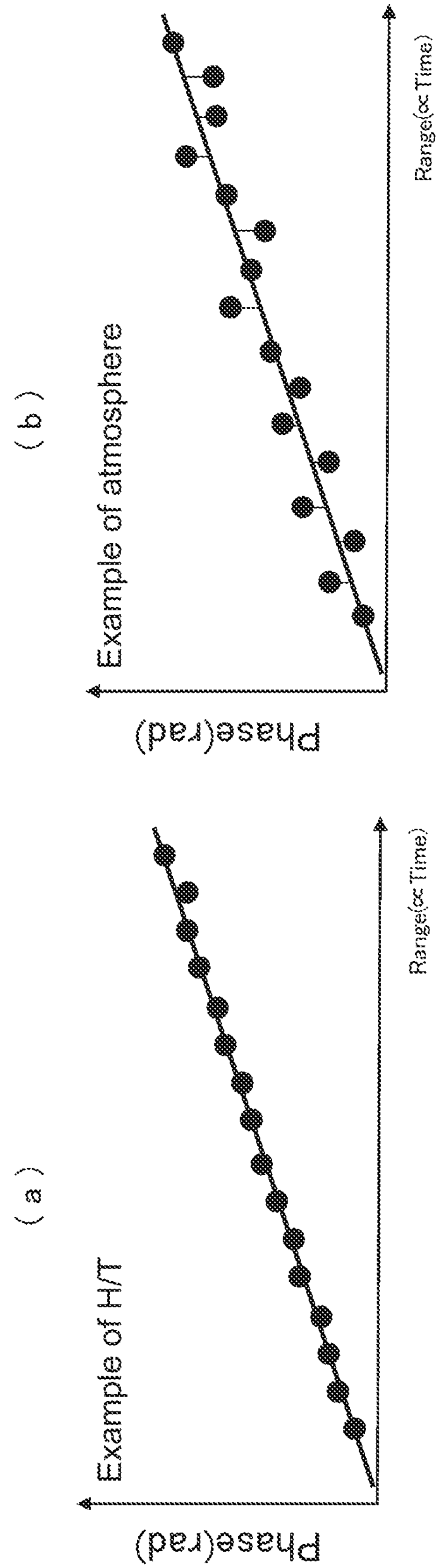
FIG. 16 is a simulation diagram of received signals of the atmosphere and the ground and detection examples obtained at the time of observation in the signal processor according to the modification of the third embodiment of the present invention.

In the case of the reflected light from the H/T, the received signal at a single initial phase is obtained and the signal intensity thereof is high, and thus the degree of certainty of the obtained instantaneous phase value is high, and the value of the above $RF_{var}$ becomes small (see FIG. 16(*a*)). On the other hand, in the case of atmospheric scattering, components of white noise are mixed due to the received signals of various initial phase values and weak signal intensity of the received signals, and the variance thereof becomes large, and the value of the above-mentioned $RF_{var}$ becomes large (see FIG. 16(*b*)). Thus, the threshold determining processing is performed on the $RF_{var}$, and it is possible to determine whether the received signal in the gate is the signal from the H/T or not. Although only the intensity is used in the determination in the above embodiment, the third embodiment has a merit that a wind speed fluctuation with the frequency fluctuation as well as the intensity is also incorporated as a single index, and the determination is performed using it, thus allowing improvement of the detection accuracy.

In the above embodiment, it is assumed that the nearest neighbor is not the reflected light from the H/T of the atmosphere but the echoes from the atmosphere. On the other hand, in the case where the situation may be other than the above situation, the threshold may be acquired in advance by light blocking or the like.

Fourth Embodiment

A fourth embodiment is provided to embed the intensity of a received signal at a time point j, at which a predetermined index relating to the received signal in the window is larger than a predetermined threshold first, as the intensity of the received signal at the time point j after the first time point, use a range bin corresponding to the time point j for accumulation processing by using the intensity of the received signal, and exclude the range bins subsequent thereto from the accumulation.

The third embodiment provides a configuration in which the spectrum accumulation is permitted even when the data of the HT flag turned ON is present in a prescribed number or more. This is because a data acquisition rate is to be ensured. In view of the purpose of being mounted on an aircraft, the data acquisition rate is also a crucial factor. The fourth embodiment is provided to delete only unnecessary data including the reflected light from the H/T and to use the remaining data for spectrum accumulation, thus improving the data acquisition rate.

Figure 17:
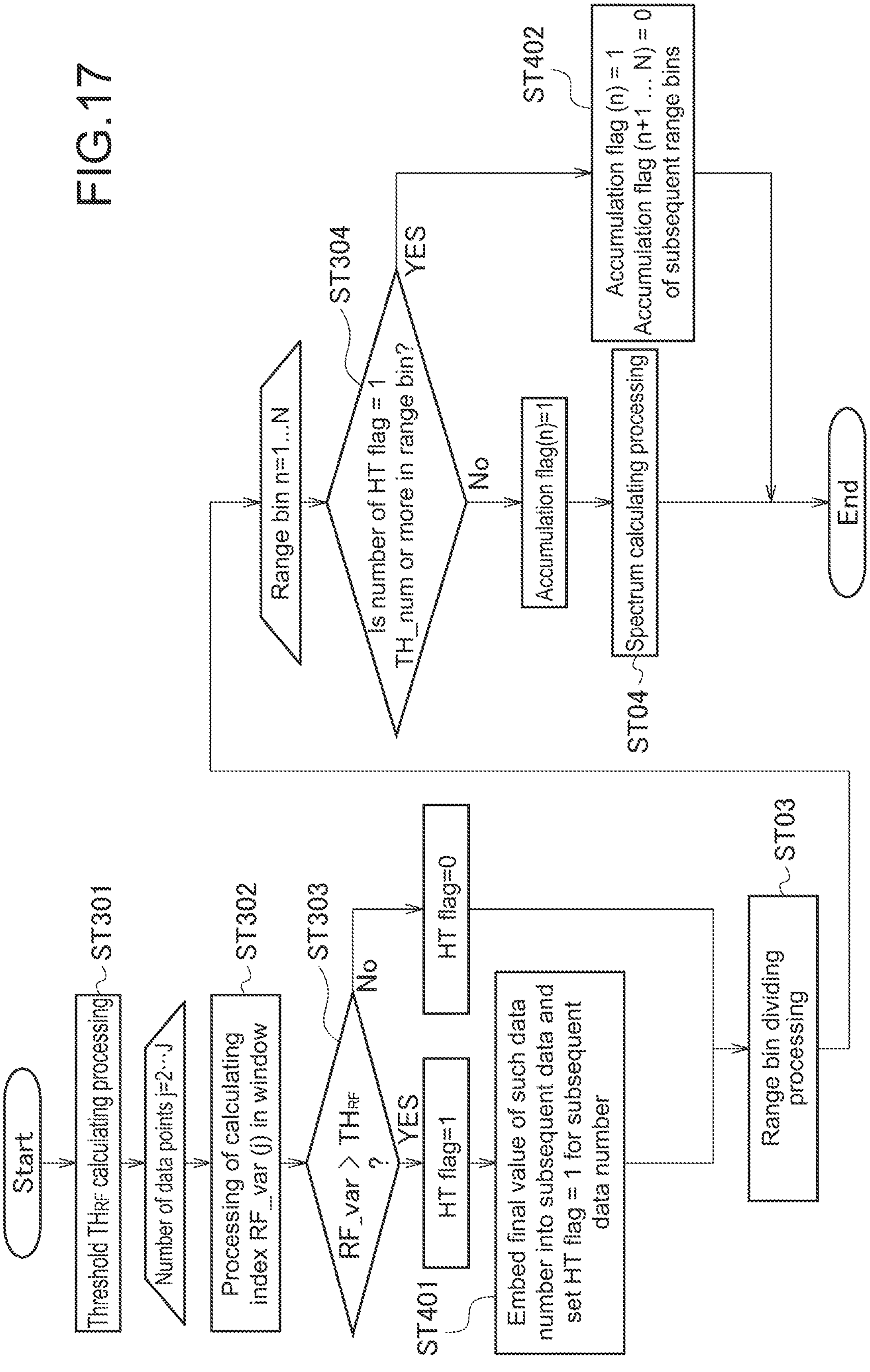
FIG. 17 is a flowchart showing the operation of a signal processor according to a fourth embodiment of the present invention.
Figure 18:
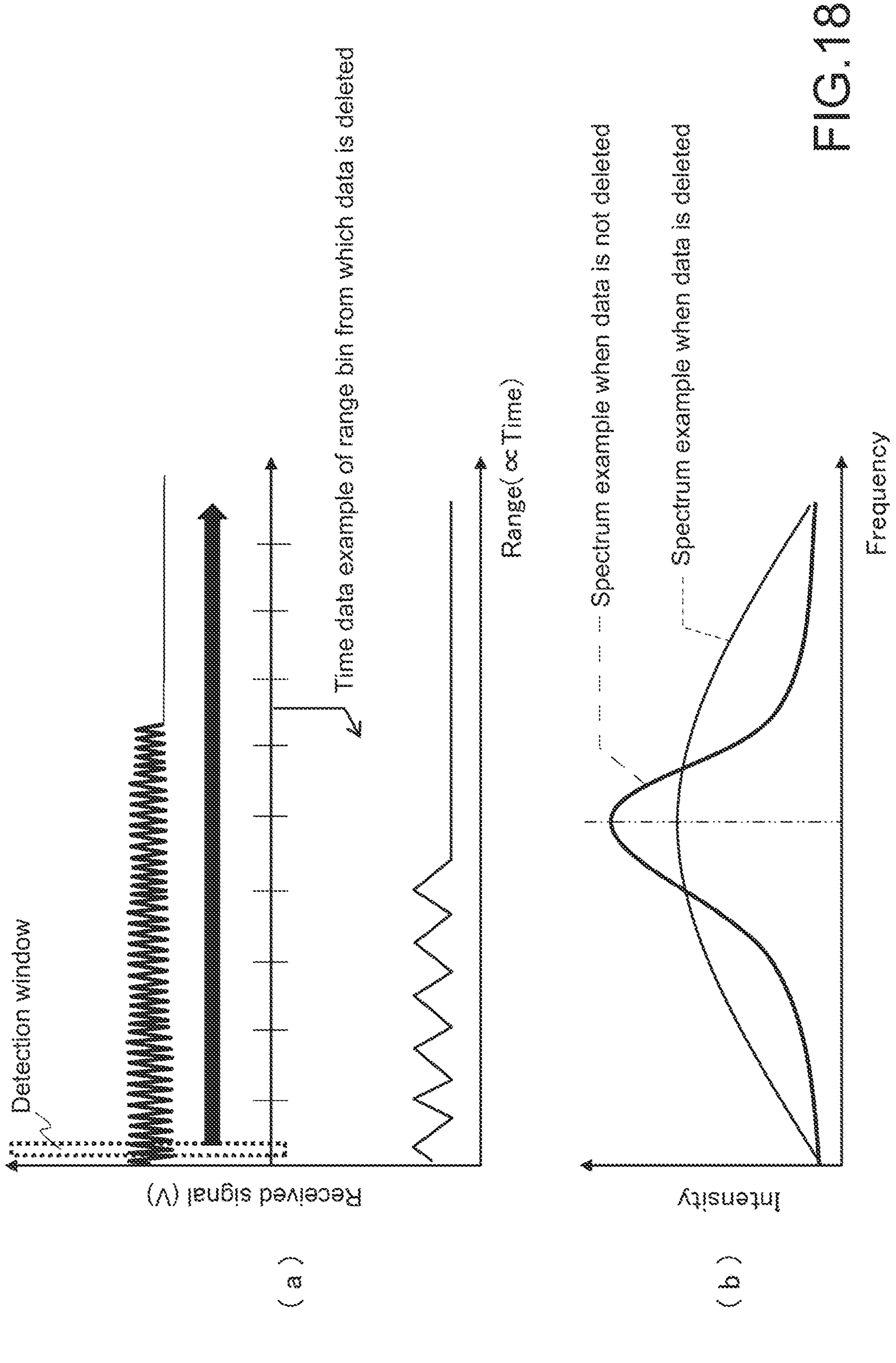
FIG. 18 is a simulation diagram of a received signal and a detection example obtained at the time of observation in the signal processor according to the fourth embodiment of the present invention.

FIG. 17 is a flowchart of the processing contents, and FIG. 18 is a conceptual diagram of the processing contents. Similarly to the third embodiment, an H/T is detected through the processing of ST301, ST302, and ST303. Subsequently, when an HT flag is set to 1 for the first time, a reception intensity value of the value of a data number j is embedded as a fixed value (see ST401, FIG. 18(*a*)). Hereinafter, the obtained received signal is divided into range bins (ST03) in the same manner as described above, and it is determined whether the number of HT flags is equal to or larger than TH_num in each range bin (ST304). If the number of HT flags is equal to or larger than TH_num, the accumulation flag is set to OFF (0) from the following range bin number. If not, the accumulation flag is set to ON (1) on the assumption that the atmosphere can be observed.

As described above, the obtained signal is halfway as shown in FIG. 18(*a*), and if the spectrum calculating processing in a later stage is performed thereon, the spectrum is broadened as compared with the case where data has not been deleted, as shown in FIG. 18(*b*). However, since the location of the peak of the spectrum does not change, the SNR improvement effect due to the accumulation effect occurs, and observation can be continued without wasting data.

Figure 19:
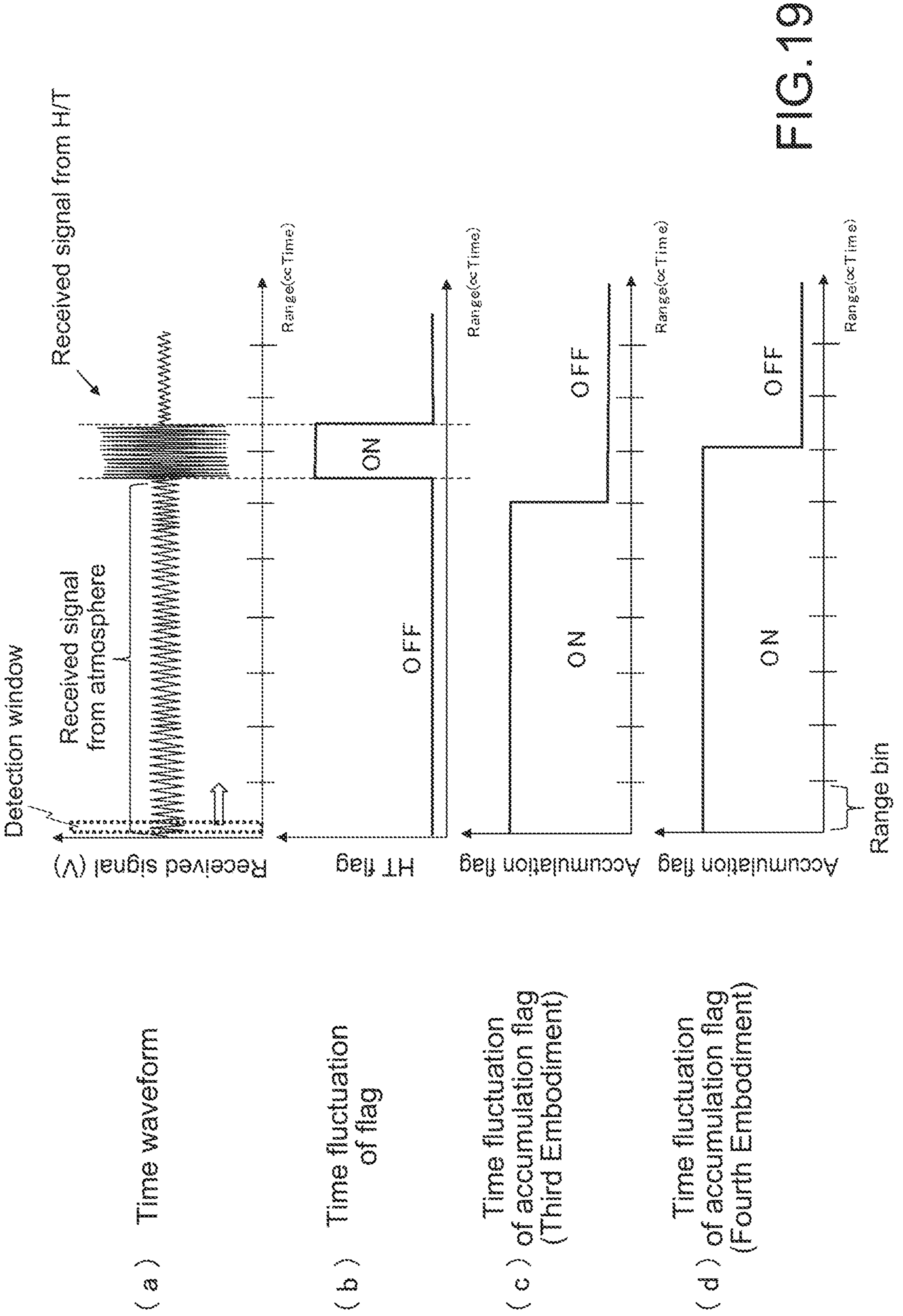
FIG. 19 is a diagram showing a comparison between a simulation diagram of a detection example when a reflected signal of the ground falls within range bins in the signal processor according to the fourth embodiment of the present invention with the detection example according to the third embodiment of the present invention.

FIG. 19 shows a comparison between the accumulation flags of the third embodiment and the fourth embodiment. When the H/T falls within range bins (see FIGS. 19(*a*) and (*b*)), in the third embodiment, accumulation is not performed on the two range bins in which the H/T exists, and range bins containing reflected light from the atmosphere are also discarded (see FIG. 19(*c*)). On the other hand, it can be effectively handled in the fourth embodiment (see FIG. 19(*d*)).

Fifth Embodiment

Figure 20:
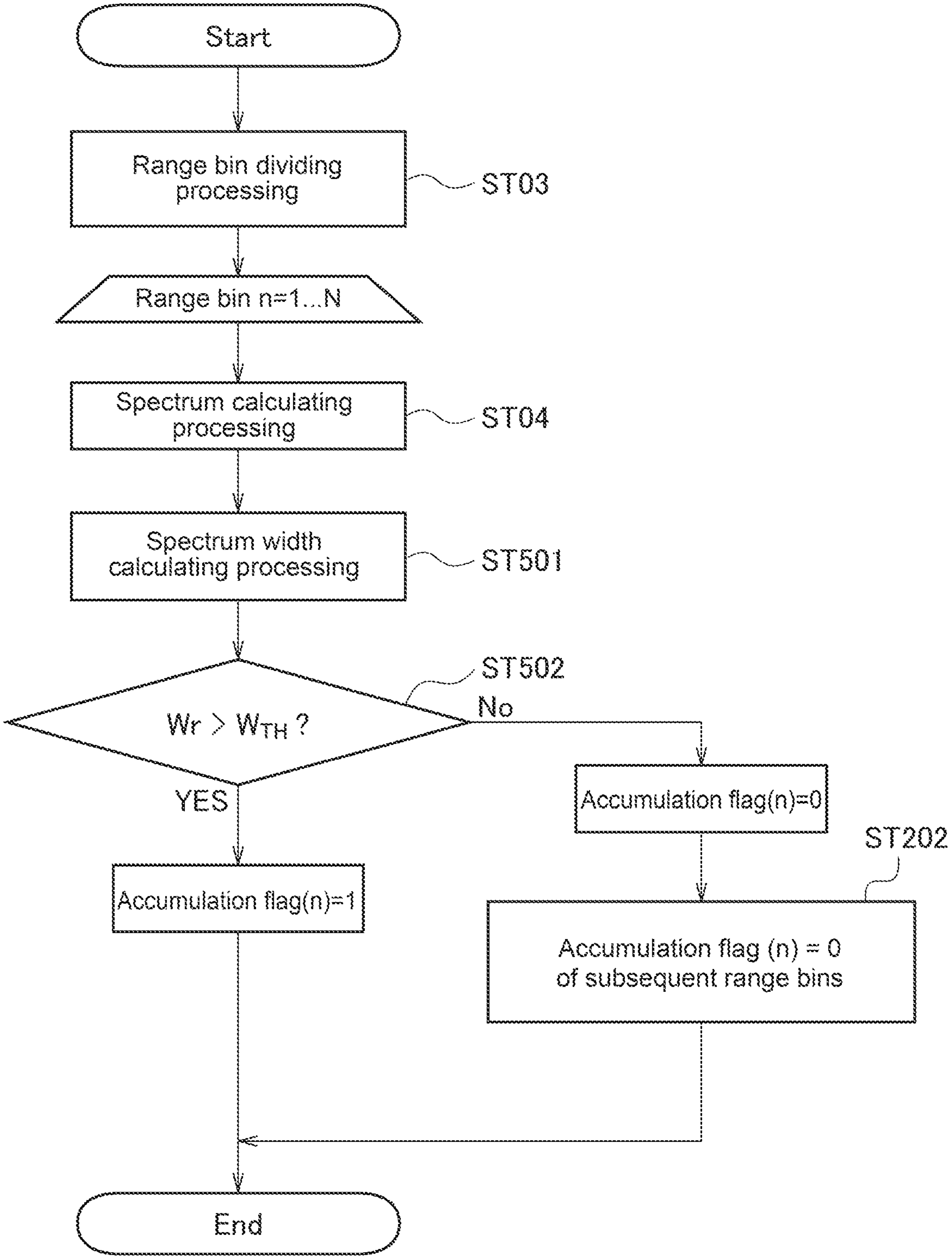
FIG. 20 is a flowchart showing the operation of a signal processor according to a fifth embodiment of the present invention.

Depending on the atmospheric conditions and the condensing distance properties of the telescope of the onboard Doppler Lidar, the received signal intensity from the atmosphere and the received signal intensity from the ground may be equivalent. In this fifth embodiment, detection using the spectrum width is performed in such a case. FIG. 20 shows a flowchart showing the processing contents of a ground detector 102 of the fifth embodiment.

A linewidth $W_{r\_theory}$ of a received signal is theoretically expressed by the following equation using a light source linewidth $W_L$, a transmitted pulse bandwidth $W_p$, and a standard deviation $W_w$ of the wind speed fluctuation.

$$W_{r\_theory} = \sqrt{w_L^2 + w_p^2 + w_w^2} \tag{9}$$

On the other hand, the received spectrum width can be calculated from the secondary moment of a spectrum SPC. The subscript n represents a range bin number. In ST501, the following equation is used to derive the spectrum width.

$$w_r = \frac{\int x^2 SPC_n(x)dx}{\int SPC_n(x)dx} \tag{10}$$

In ST502, determination using a threshold $W_{TH}$, $W_r > W_{TH}$ is performed on the obtained spectrum width. x represents a frequency bin number. In the case of the H/T, it is a stationary object, and thus the standard deviation $W_w$ is zero. For that reason, the threshold $W_{TH}$ is set in advance as follows.

$$W_{TH} = \alpha_w \times w_{r\_theory} = \alpha_w \times \sqrt{w_L^2 + w_p^2} \tag{11}$$

$\alpha_w$ is a coefficient for the likelihood of the threshold, and a value such as 1.5 is input thereto. Although the threshold using a theoretical value is used in the above, a threshold may be set on the basis of a measured value obtained by performing light blocking.

Alternatively, as will be described below, the nearest wind speed width may be used as a reference, but this embodiment is not limited thereto.

$$W_r < \alpha \times W_r(1) \tag{12}$$

Hereinafter, similarly to the above embodiments, the accumulation flag is turned ON/OFF in response to the determination in ST502, and the accumulation processing is performed.

Sixth Embodiment

A sixth embodiment is provided to calculate a range bin, in which the data of the ground is mixed, using the altitude to the ground obtained from the attitude/altitude data of an aircraft, and exclude the range bins subsequent to that range bin from the spectrum accumulation, thus allowing the determination of a signal from the ground.

Figure 21:
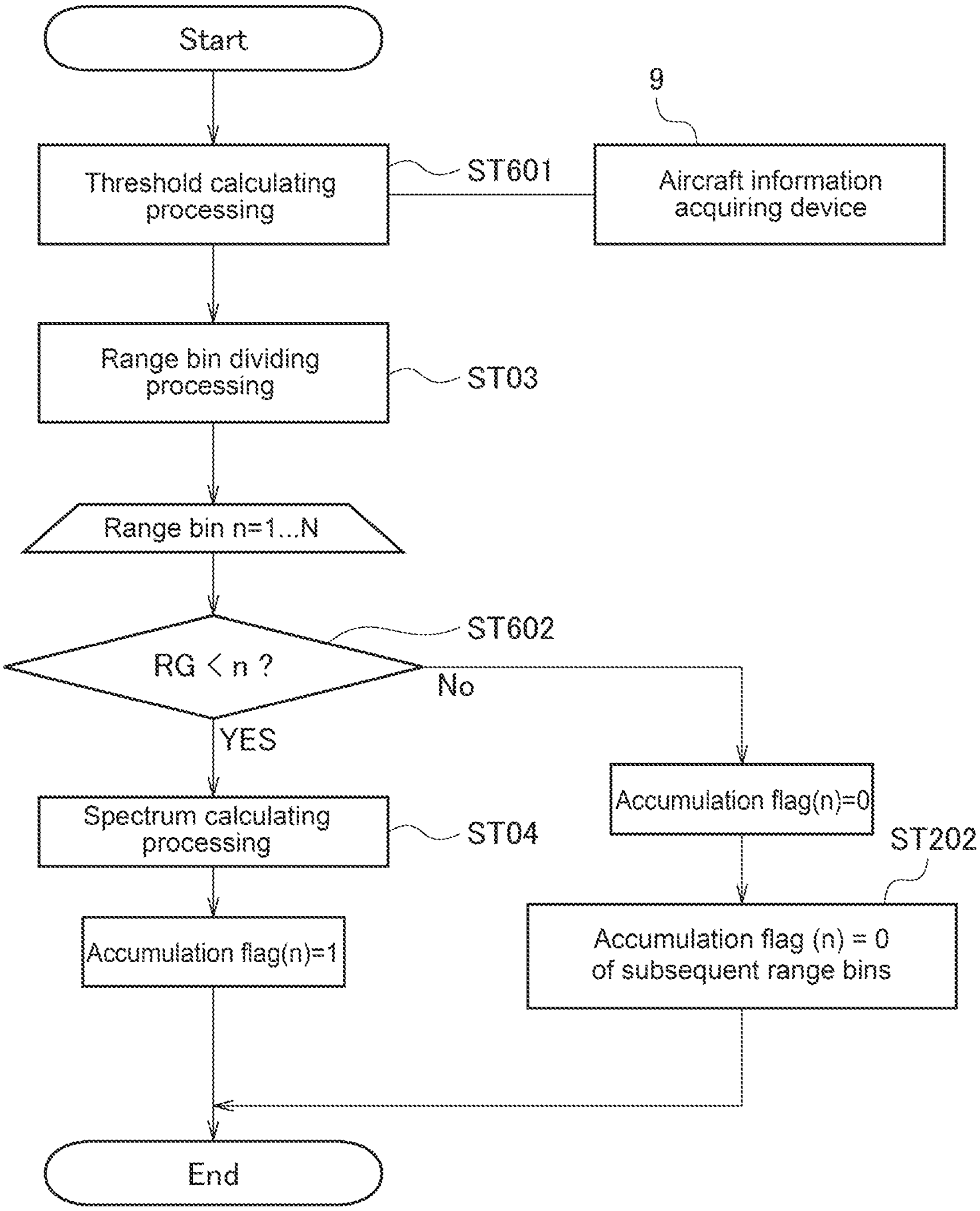
FIG. 21 is a flowchart showing the operation of a signal processor according to a sixth embodiment of the present invention.
Figure 22:
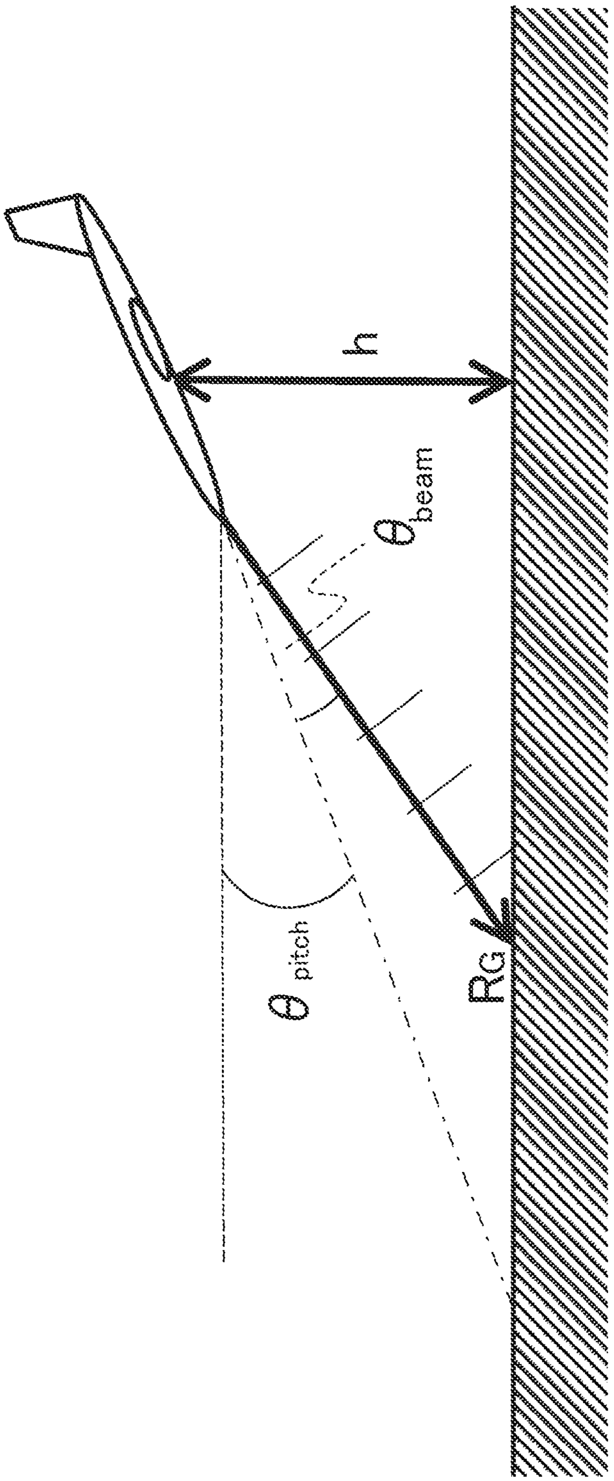
FIG. 22 is an explanatory diagram of mathematical formula marks used in the signal processor according to the sixth embodiment of the present invention.

FIG. 21 is a flowchart of the processing contents of the sixth embodiment, and FIG. 22 is a conceptual diagram of the processing contents. The Doppler Lidar according to the sixth embodiment can be configured similarly to that shown in FIG. 1, for example.

A signal processor 8 according to the sixth embodiment calculates a range bin RG corresponding to the ground on the basis of the altitude information and angle information of an aircraft, which are obtained from an aircraft information acquiring device 9 (ST601). Hereinafter, in the description of this embodiment, the attitude angle of the pitch only is used for the purpose of simplification.

$$RG = \left\lfloor \frac{\dfrac{h}{\sin(\theta_{pitch} + \theta_{beam})}}{R_{res}} \right\rfloor \tag{13}$$

$R_{res}$ represents the resolution, the brackets surrounding the right-hand side represent rounding down, $\theta_{pitch}$ and $\theta_{beam}$ represent an angle of depression and an angle of beam irradiation, respectively, and h represents an altitude of the aircraft from the ground. Although the distance of the offset to be observed is assumed to be zero for formulation, an offset may be provided. In ST602, if the RG obtained by the above equation is less than a range bin n on which the processing is performed, the accumulation flag is set to ON (1) assuming that the atmosphere is being observed rather than the ground. If not, the accumulation flag is set to OFF (0) assuming that measurement is performed on the ground or beyond the ground (ST202).

Figure 23:
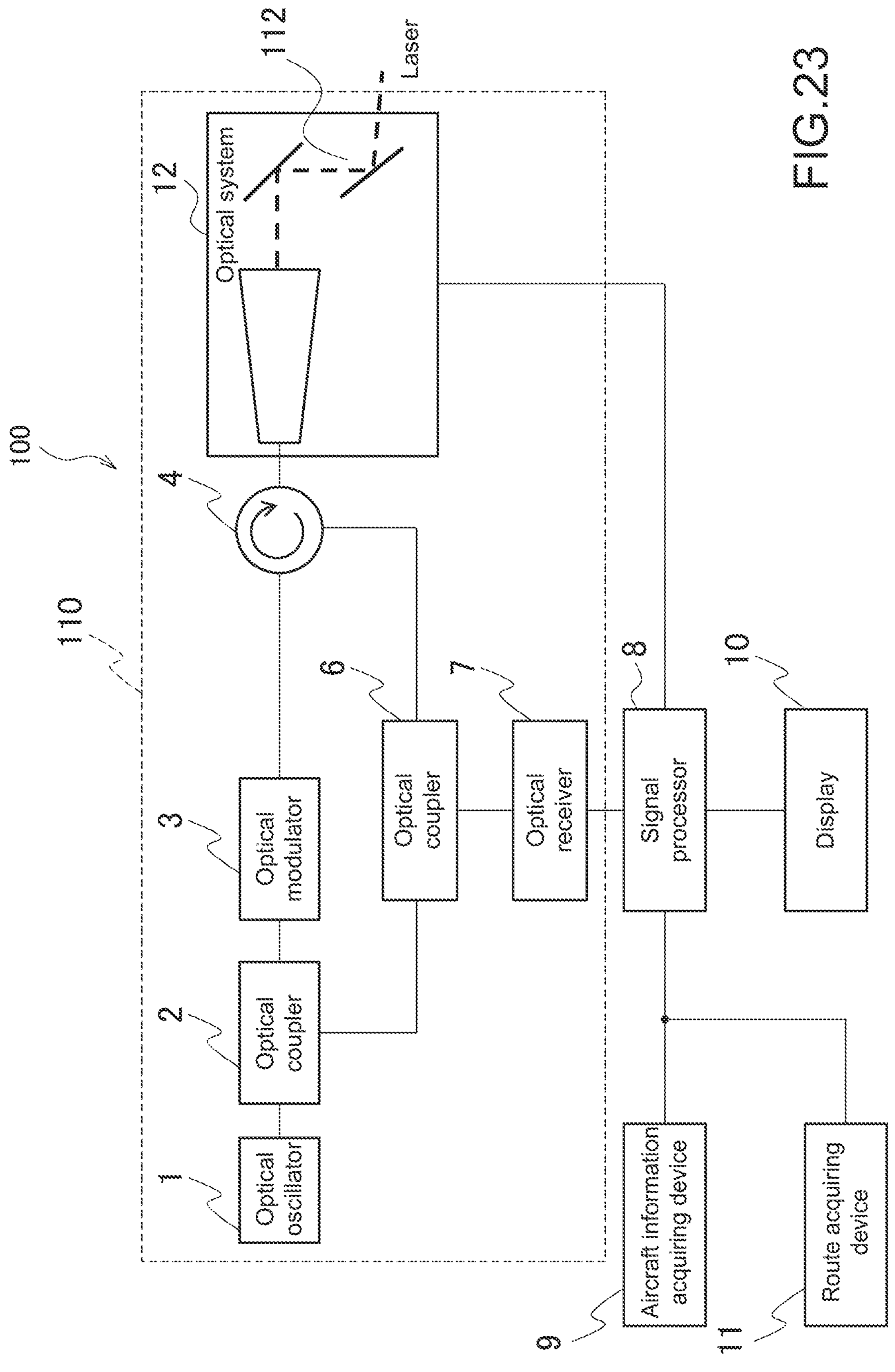
FIG. 23 is a block diagram showing the configuration of a Doppler Lidar according to a modification of the sixth embodiment of the present invention.
Figure 24:
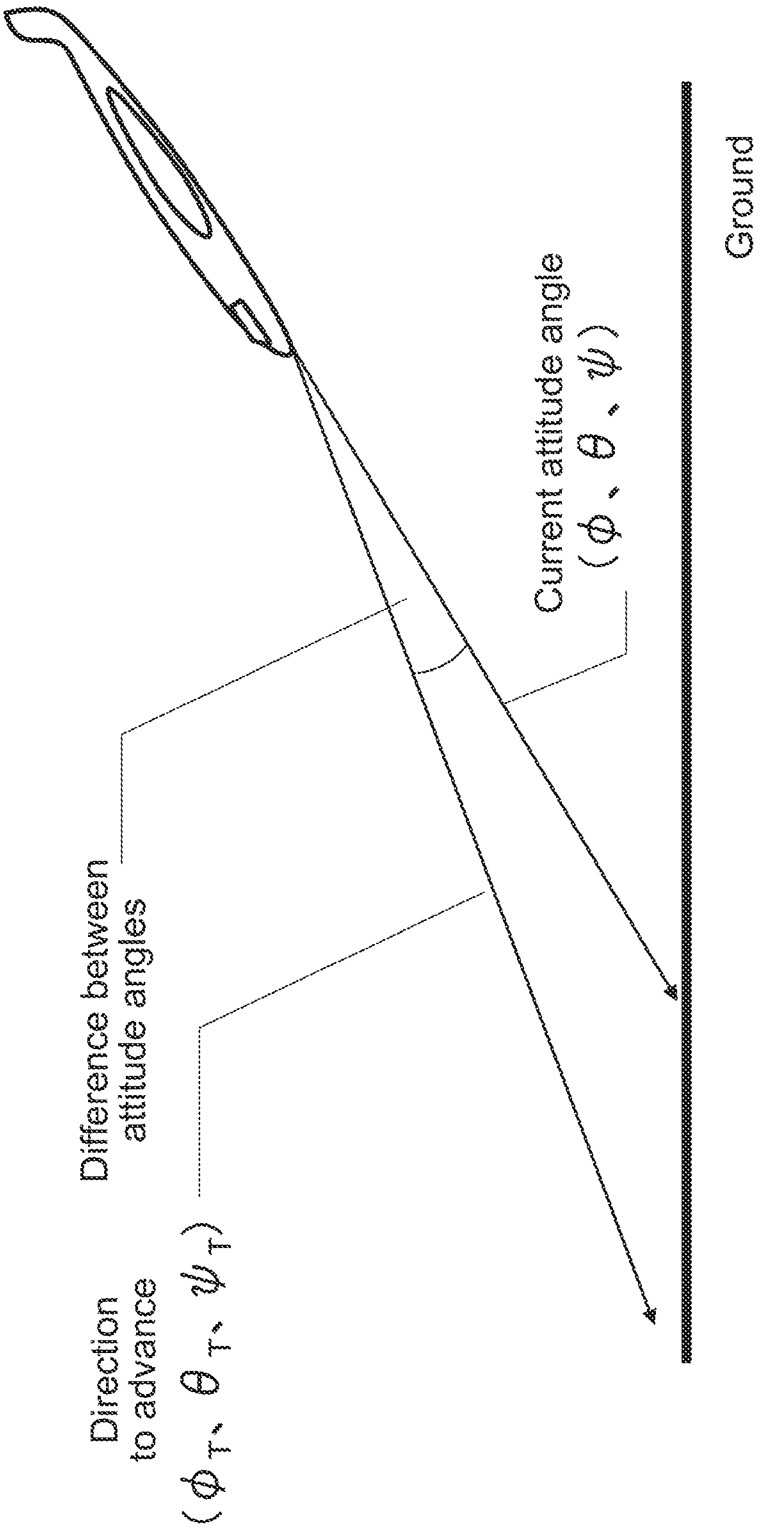
FIG. 24 is an explanatory diagram of mathematical formula marks used in a signal detector according to the modification of the sixth embodiment of the present invention.

FIG. 23 shows a modification of this embodiment. In the above equation, $\theta_{pitch}$ is added to the equation to allow the laser light to be applied in different directions for each line of sight. As shown in FIG. 23, however, the following configuration may be provided, which includes an optical system 12 capable of changing the path of laser light output from the optical system by an optical mirror 112 and a route acquiring device 11 that acquires an ideal route. As shown in FIG. 24, a signal processor 8 calculates the difference between the values of the current attitude angles ($\varphi$, $\theta$, $\psi$) ($\varphi$: roll, $\theta$: pitch, $\psi$: yaw) acquired from an aircraft information acquiring device 9 and the true values to be originally taken (values of the direction to be advanced) that are acquired from the route acquiring device 11 ($\varphi_T$, $\theta_T$, $\psi_T$) using the following expression.

$$\Theta_{com} = (\varphi_T, \theta_T, \psi_T) - (\varphi, \theta, \psi)$$

The angle arrangement $\Theta_{com}$ is used as a correction value to transmit an electric signal for controlling the beam angle to the optical system 12. The optical mirror 112 included in the optical system 12 typically includes a planar mirror such as a galvano mirror. It is possible to use a prism other than the optical mirror 112. Further, a telescope including an electro-optic lens capable of adjusting laser light emission angle by an electric signal may be used, and the present invention is not limited thereto. At that time, the RG is calculated using $\Theta_{com}$, and the ground is detected. This makes it possible to detect the ground while observing the same space, thus making it possible to improve the accuracy of wind speed measurement.

Seventh Embodiment

A seventh embodiment is provided to determine, for each range bin per pulse of laser light, whether an absolute value of a wind speed value calculated from a received signal in the range bin is equal to or less than a predetermined threshold, determine that the received signal of the range bin include a signal derived from a hard target if the absolute value is less than the predetermined threshold, and exclude, when the spectrum of a digital signal corresponding to the received signal of each range bin is accumulated, the accumulation of the spectrum of the range bin determined to include a signal derived from the hard target and the spectrum of a range bin far from that range bin.

For example, in the sixth embodiment, the attitude/altitude information of the aircraft is used to detect a range bin in which the data of the ground is mixed. In a seventh embodiment, however, a speed value of the aircraft is fed back per pulse of laser light to form a band-pass filter centered on a signal in a frequency band corresponding to the speed value, and filter processing is performed using the band-pass filter on the received signal before being divided into the range bins. In other words, in this embodiment, a feedback system to remove the signal in the frequency band corresponding to the aircraft speed of zero is provided, which makes it possible to suppress the reflected signal from the ground and improve the accuracy of wind speed measurement.

Figure 25:
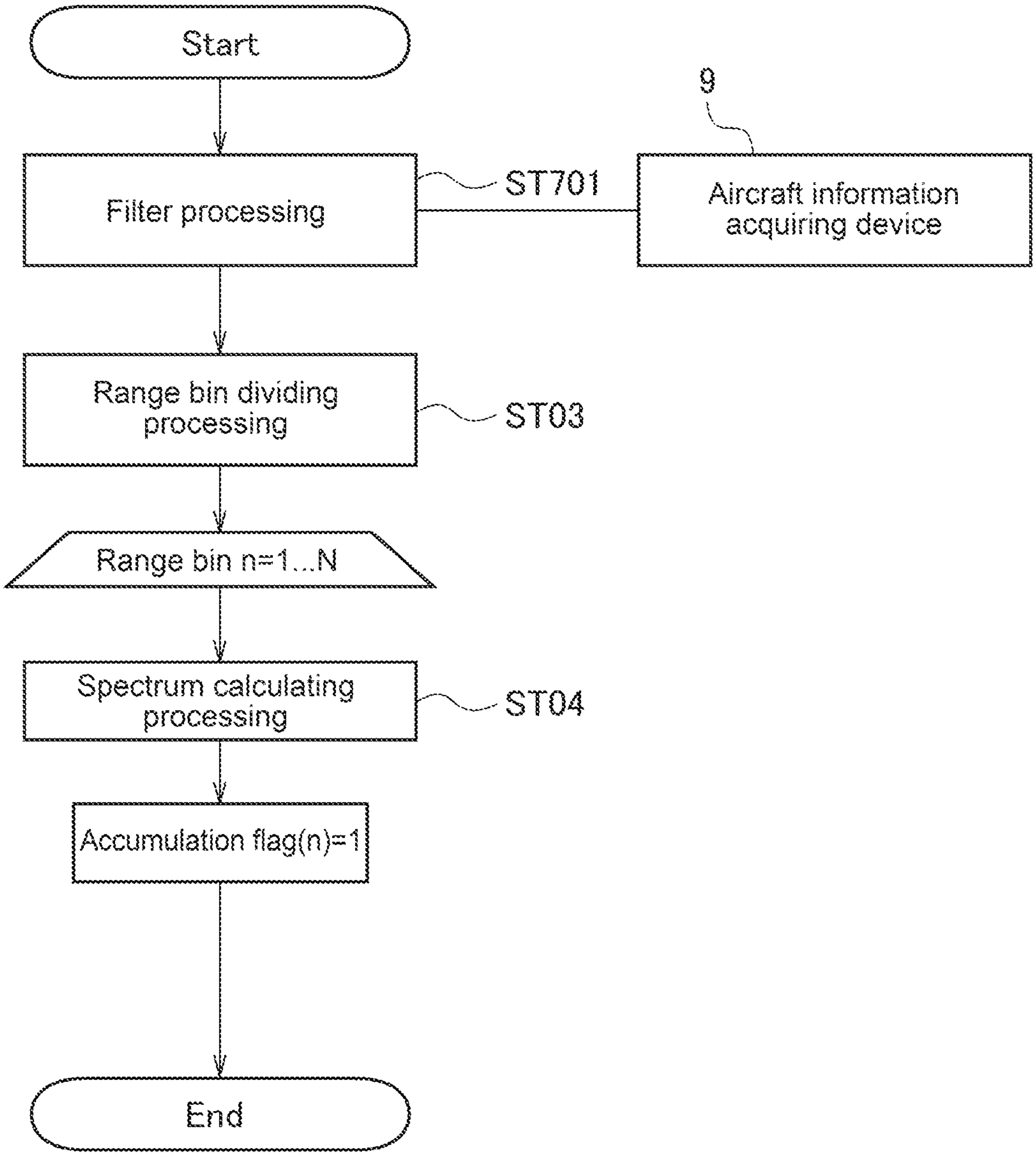
FIG. 25 is a flowchart showing the operation of a signal processor according to a seventh embodiment of the present invention.
Figure 26:
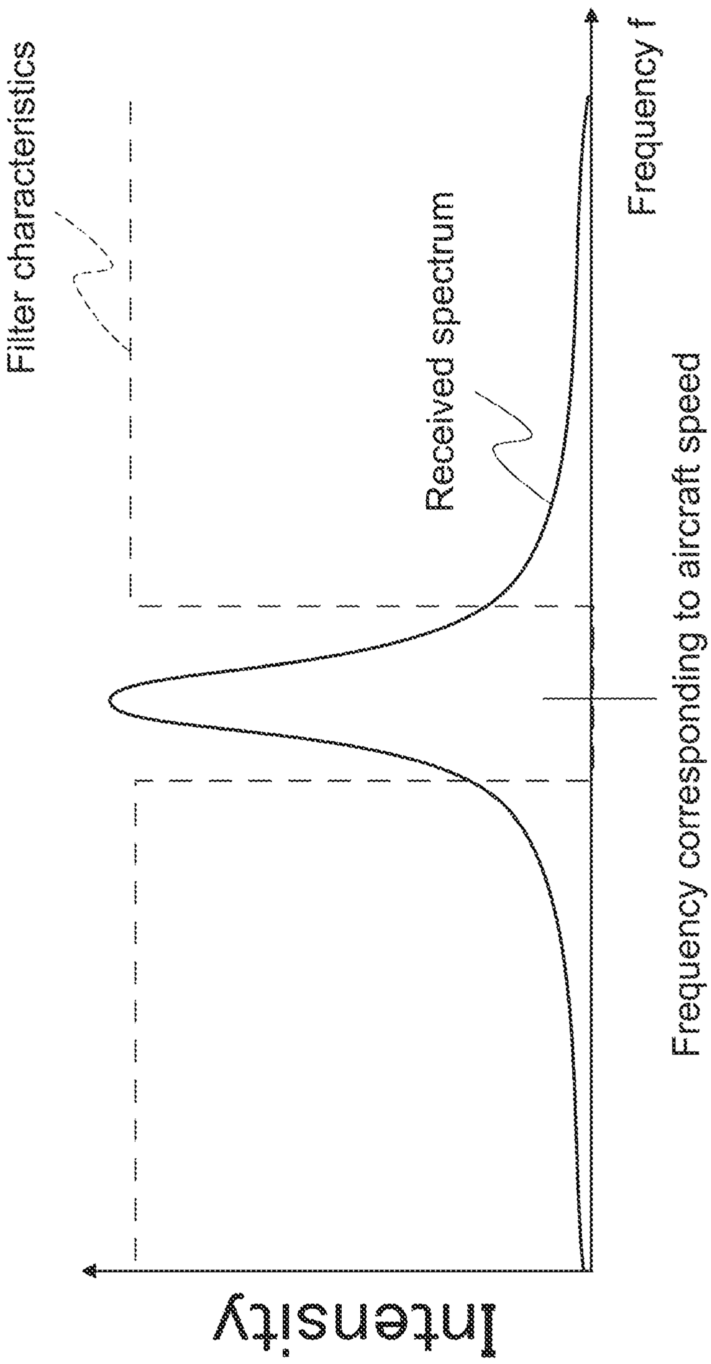
FIG. 26 is a diagram for describing the filtering properties of the signal processor according to the seventh embodiment of the present invention.

FIG. 25 is a flowchart showing the processing contents of the seventh embodiment, and FIG. 26 is a conceptual diagram showing the processing contents. The Doppler Lidar according to the seventh embodiment can be configured similarly to that shown in FIG. 1, for example.

A ground detector 102 of a signal processor 8 according to the seventh embodiment calculates a frequency $f_{vehicle}$ corresponding to an aircraft speed by the following equation using a traveling speed of the aircraft, which is obtained from an aircraft information acquiring device 9. v represents the aircraft speed, and λ represents the wavelength of a laser light source.

$$f_{vehicle} = 2v/\lambda \tag{14}$$

In filter processing in ST701, a digital filter of a bandwidth $f_{BP}$ centered on the $f_{vehicle}$ is formed (see FIG. 26). For example, the Butterworth filter or the like can be used as the filter, but the present invention is not limited thereto.

For the purpose, since the sensitivity to a wind speed value close to zero or an H/T signal (Doppler zero) is not required, filter processing using the wind speed value of zero, i.e., so as to cut the vicinity of the frequency of the aircraft speed, is performed.

This embodiment is configured by software (ST701 shown in FIG. 25), but it may also be configured by hardware. Such a case can also contribute to reduction in the dynamic range that the A/D converter should have. The reflected light mainly from the ground is very strong, and thus signals are often saturated. This requires a wide dynamic range of the A/D converter, but it can be mitigated by this configuration.

Hereafter, the received signal, in which the vicinity of the frequency of the aircraft speed is cut, is time-divided by the range bin dividing processing ST03, and FFT processing is performed on each range bin in the spectrum calculating processing ST04 to calculate the wind speed.

Eighth Embodiment

An eighth embodiment is provided to calculate a wind speed value on the basis of a spectrum of a received signal obtained after signal values in a predetermined frequency region are set to zero at a first peak of the spectrum of a range bin, which is determined to include a signal derived from a hard target, and around the first peak.

Figure 27:
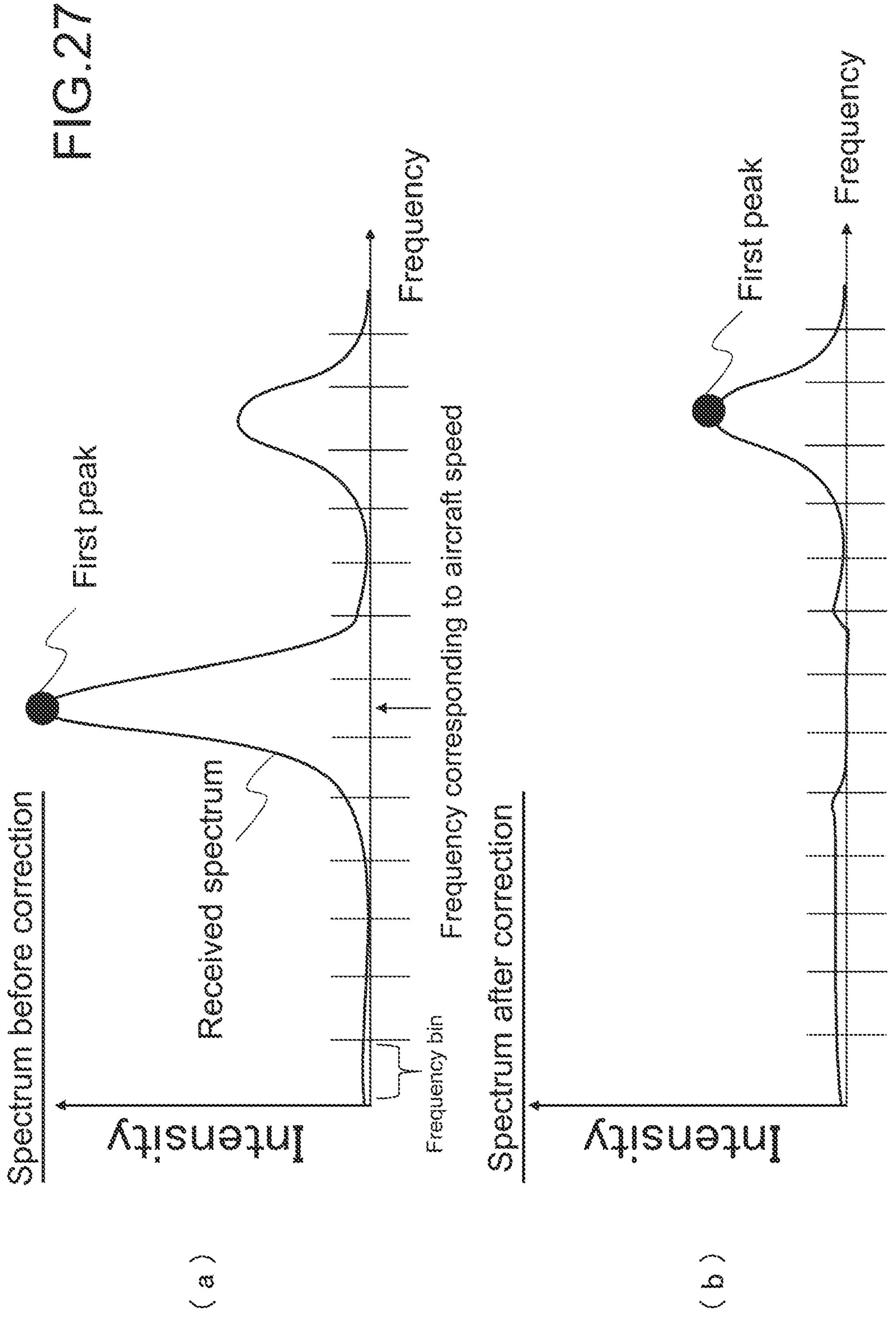
FIG. 27 is a simulation diagram showing the processing contents of a signal processor according to an eighth embodiment of the present invention.
Figure 28:
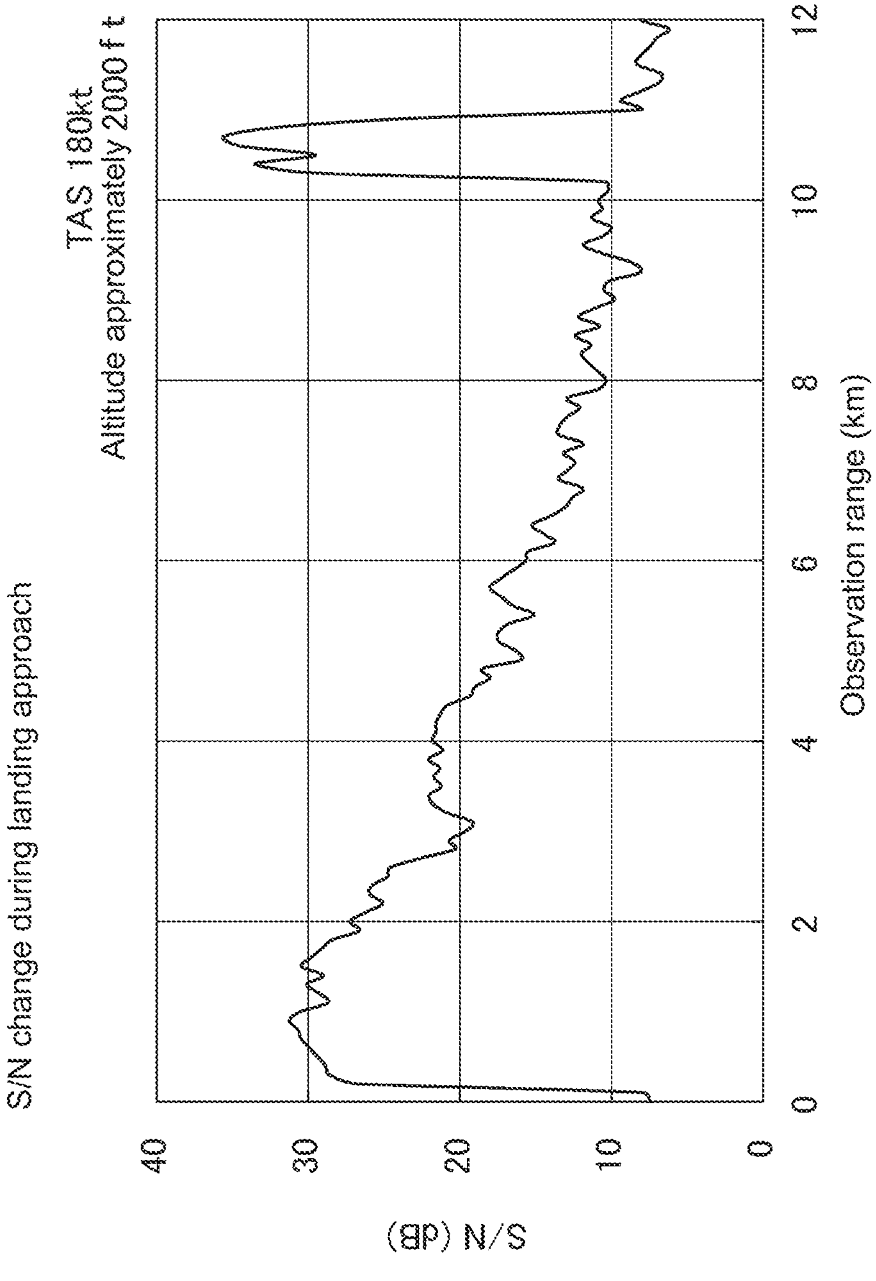
FIG. 28 is a graph showing measurement results of the change in S/N during a landing approach of a Doppler Lidar mounted on an aircraft.

FIG. 27 is a diagram showing the processing contents of the eighth embodiment. The Doppler Lidar according to the eighth embodiment can be configured similarly to that shown in FIG. 1, for example.

In the eighth embodiment, in the processing per pulse of laser light, the signal in the frequency band, which is determined to be a signal of the ground in the above seventh embodiment, is set to a first peak (see FIG. 27(*a*)), and signals in any frequency band at the first peak and around the first peak are set to zero (see FIG. 27(*b*)). Using the signals obtained after the signals in any frequency band at the first peak and around the first peak are set to zero, the peak detection and the wind speed estimation are performed. This makes it possible to eliminate the reflected light from the ground and accumulate spectral signals containing atmospheric echoes, thus allowing observation without lowering the frame rate.

For example, in a ground detector 102 of a signal processor 8, the aircraft speed in the traveling direction is acquired from an aircraft information acquiring device 9. The accumulation flag is set to 1 for a range bin in which the accumulation flag becomes zero for the first time in the spectral peak calculation in a wind speed calculating processor 104 at a later stage, that is, the accumulation flag becomes zero in each determination processing (for example, ST11, ST201, ST304) in each of the above embodiments. Subsequently, after a frequency bin of the first peak ±Mg is set to zero with respect to the spectrum, the peak is detected again, and the wind speed is then calculated as described in the above first embodiment and the like.

Ninth Embodiment

A ninth embodiment is provided to combine the ground detectors according to the first to seventh embodiments described above in parallel, connect the accumulation flags output from the respective processes to an OR circuit, and perform spectrum accumulation by using the output. For example, in the first embodiment, loop calculation is performed from a long distance, and ground detection is performed, whereas in the second embodiment, ground detection is performed from a short distance. If the signal falls within a plurality of range bins, e.g., if reflection from the ground falls within range bins or if a range bin is much smaller than the pulse width, the sum of the results of the various detection methods can be used to suppress detection omissions and improve its accuracy. If the wind speed value is uniform, the spectrum width is narrowed, which makes it possible to cope with any of the cases where it is difficult to perform discrimination with only the spectrum width, the atmospheric density is high and the dynamic range of the A/D converter is small, it is difficult to perform discrimination using the intensity value due to saturation, and the environment has changed to an environment in which aircraft data cannot be acquired due to an equipment failure or the like. This provides a merit that stable ground detection can be achieved.

Note that, in this embodiment, the measurement accuracy may be improved by taking a logical product, and the present invention is not limited thereto.

Other Examples

The remote airflow observation device has a feature that the remote airflow can be observed even in clear weather, and is expected to achieve the provision of information of turbulence and the like during the landing approach of an aircraft. The application of the present invention allows a reduction of false alarms caused by the influence of ground reflection, and the present invention can be applied to a passenger aircraft so as to inhibit the occurrence of accidents caused by turbulence and the like.

The present invention is not limited to the embodiments described above and can be variously modified to be implemented, and the scope of implementation also belongs to the scope of the technical idea of the present invention. For example, in the present invention, the embodiments may be freely combined with each other, may be modified in any component, or may omit any component within the scope of the present invention.

REFERENCE SIGNS LIST

1 optical oscillator
2 optical coupler
3 optical modulator
4 optical circulator
5 optical system
6 optical coupler
7 optical receiver
8 signal processor
9 aircraft information acquiring device
10 display
11 route acquiring device
12 optical system
100 Doppler Lidar (remote airflow observation device)
101 A/D converter
102 ground detector
103 spectrum accumulating processor
104 wind speed calculating processor
105 display
110 measurement unit
112 optical mirror

The invention claimed is:

1. A remote airflow observation device, comprising:
a measurement unit configured to:
radiate transmission light including pulse-form laser light,
receive reflected light of the radiated transmission light as reception light, and
output a received signal for calculating a wind speed value on a basis of the transmission light and the reception light, the measurement unit including an optical system configured to radiate the transmission light and a movable optical mirror or prism configured to change a path of the transmission light output from the optical system;
an aircraft information acquiring device configured to acquire an altitude of an aircraft above ground and a current attitude of the aircraft on which the remote airflow observation device is mounted;
a route acquiring device configured to acquire a true traveling direction of the aircraft; and
a signal processor configured to perform processing for distributing the received signal to range bins by time-dividing the received signal and for removing a signal derived from a hard target from the received signal, wherein the signal processor is configured to determine a hard-target range bin in which the transmission light falls on ground serving as the hard target on a basis of the received signal distributed to the range bins or on a basis of information including the altitude of the aircraft above the ground and the current attitude of the aircraft acquired by the aircraft information acquiring device, and exclude, when accumulating a spectrum of a digital signal corresponding to the received signal in each of the range bins, accumulation of the spectrum of the hard-target range bin and accumulation of spectra of one or more range bins farther than the hard-target range bin, calculate a correction value corresponding to a difference between the current attitude acquired by the aircraft information acquiring device and the true traveling direction acquired by the route acquiring device, and output, on a basis of the correction value, an electric signal for controlling a beam angle of the optical system by the movable optical mirror or prism so as to correct a relative angular difference between the current attitude and the transmission light and cause the transmission light to observe the same space between pulses.

2. The remote airflow observation device according to claim 1, wherein the signal processor is configured to search for, when the radiated transmission light is reflected by the hard target, the range bin in which the transmission light falls on the ground serving as the hard target from the received signal distributed to the range bins on a basis that intensity of the reception light increases or that a frequency fluctuation of the reception light becomes minimum.

3. The remote airflow observation device according to claim 2, wherein the signal processor is configured to
define a sum of a mean and a standard deviation of the received signal in each of the range bins as an index,
determine whether the index exceeds a predetermined threshold with respect to the received signal from a far range bin, and
determine that the received signal of a range bin in which the index reaches the predetermined threshold or more first includes the signal of the transmission light falling on the ground serving as the hard target.

4. The remote airflow observation device according to claim 2, wherein the signal processor is configured to determine whether, when a ratio (SNR(n)/SNR(n−1)) of a peak value of the received signal of an n-th range bin (SNR(n)) and a peak value of the received signal of an (n−1)-th range bin adjacent thereto on a far side (SNR(n−1)) exceeds a predetermined threshold with respect to the received signal from a far range bin, the received signal of the n-th range bin includes the signal of the transmission light falling on the ground serving as the hard target.

5. The remote airflow observation device according to claim 4, wherein the predetermined threshold is $TH_{ratio}$, which is expressed by $$TH_{ratio} = (R_{HT}/\pi)/\beta$$

where $R_{HT}$ is reflectance of the hard target, and β is a backscatter coefficient that is an index representing strength of waves scattered in a direction from which original waves travel backwardly when the waves are scattered by impinging on an object.

6. The remote airflow observation device according to claim 2, wherein the signal processor is configured to:
scan a detection window with a predetermined time duration from a near side in a time axis direction in a time waveform of the received signal per pulse of the laser light, and determine whether, when a predetermined index relating to the received signal in the window is larger than a predetermined threshold, the received signal of the range bin including the window includes the signal of the transmission light falling on the ground serving as the hard target.

7. The remote airflow observation device according to claim 6, wherein the index is a root mean square (RMS) of a residual with a first-order linear function by least squares approximation performed on a phase-value-fluctuating waveform subjected to unwrap processing after performing a Hilbert transform on the time waveform of the received signal in the window to derive a phase value, the Hilbert transform being an operation configured to take a real function or signal and generate a signal in parallel to it to produce a 90-degree phase difference between the original signal and the generated signal.

8. The remote airflow observation device according to claim 6, wherein the signal processor is configured to embed the intensity of the reception light at a time point at which the predetermined index relating to the received signal in the window is larger than the predetermined threshold first, as the intensity of the reception light at a time point after the first time point, select the range bin corresponding to the time point for accumulation processing by the intensity of the reception light, and exclude the range bins subsequent to the range bin from the accumulation.

9. The remote airflow observation device according to claim 2, wherein the signal processor is configured to:

calculate the spectrum of the digital signal corresponding to the received signal in each of the range bins per pulse of the laser light, and determine, when a linewidth of the spectrum in each of the range bins per pulse of the laser light is equal to or less than a predetermined threshold, that the range bin includes the signal of the transmission light falling on the ground serving as the hard target.

10. The remote airflow observation device according to claim 1, wherein the measurement unit is configured to acquire information of a true traveling direction of the aircraft, and include a movable optical mirror or prism that corrects a relative angular difference between a current attitude and the transmission light.

11. The remote airflow observation device according to claim 1, wherein the signal processor is configured to:

determine, for each of the range bins per pulse of the laser light, whether an absolute value of a wind speed value calculated from the received signal in the range bin is equal to or less than a predetermined threshold, and determine, if the absolute value is equal to or less than a predetermined threshold, whether the received signal of the range bin includes the signal of the transmission light falling on the ground serving as the hard target.

12. The remote airflow observation device according to claim 11, wherein the signal processor is configured to feedback, per pulse of the laser light, a speed value of an aircraft on which the remote airflow observation device is mounted, to form a band-pass filter centered on the speed value, and perform filter processing by the band-pass filter on the received signal before being divided into the range bins.

13. The remote airflow observation device according to claim 12, wherein the signal processor is configured to calculate the wind speed value on a basis of the spectrum of the received signal obtained after signal values in a predetermined frequency region are set to zero at a first peak of the spectrum of the range bin determined to include the signal of the transmission light falling on the ground serving as the hard target and around the first peak.

14. The remote airflow observation device according to claim 12, wherein the signal processor is configured to calculate the wind speed value on a basis of the spectrum of the received signal obtained after signal values in a predetermined frequency region are set to zero at a first peak of the spectrum of the range bin determined to include the signal of the transmission light falling on the ground serving as the hard target and around the first peak.

15. A remote airflow observation method, comprising:

radiating transmission light including pulse-form laser light;

receiving reflected light of the radiated transmission light as reception light;

outputting a received signal for calculating a wind speed value on a basis of the transmission light and the reception light;

configuring a measurement unit including an optical system to radiate the transmission light and a movable optical mirror or prism configured to change a path of the transmission light output from the optical system;

configuring an aircraft information acquiring device to acquire an altitude of an aircraft above ground and a current attitude of the aircraft on which the remote airflow observation device is mounted;

configuring a route acquiring device to acquire a true traveling direction of the aircraft;

distributing, by a computing device, the received signal to range bins by time-dividing the received signal;

removing, by the computing device, a signal derived from a hard target from the received signal;

searching for, by the computing device, a range bin in which the transmission light falls on ground serving as the hard target on a basis of the received signal distributed to the range bins or on a basis of information including the altitude of the aircraft above the ground and the current attitude of the aircraft acquired by the aircraft information acquiring device;

excluding, by the computing device, when accumulating a spectrum of a digital signal corresponding to the received signal in each of the range bins, accumulation of the spectrum of a hard-target range bin and accumulation of spectra of one or more range bins farther than the hard-target range bin;

calculating a correction value corresponding to a difference between the current attitude acquired by the aircraft information acquiring device and the true traveling direction acquired by the route acquiring device; and outputting, on a basis of the correction value, an electric signal for controlling a beam angle of the optical system by the movable optical mirror or prism so as to correct a relative angular difference between the current attitude and the transmission light and cause the transmission light to observe the same space between pulses.

16. A non-transitory computer readable medium having stored therein program instructions executable by a computing system to cause the computing system to perform a remote airflow observation method for a remote airflow observation device including a measurement unit configured to radiate transmission light including pulse-form laser light, receive reflected light of the radiated transmission light as reception light, and output a received signal for calculating a wind speed value on a basis of the transmission light and the reception light, the measurement unit including an optical system configured to radiate the transmission light and a movable optical mirror or prism configured to change a path of the transmission light output from the optical system, the method comprising:

configuring an aircraft information acquiring device to acquire an altitude of an aircraft above ground and a current attitude of the aircraft on which the remote airflow observation device is mounted;

configuring a route acquiring device to acquire a true traveling direction of the aircraft;

distributing the received signal to range bins by time-dividing the received signal;

removing a signal derived from a hard target from the received signal;

searching for a range bin in which the transmission light falls on ground serving as the hard target on a basis of the received signal distributed to the range bins or on a basis of information including the altitude of the aircraft above the ground and the current attitude of the aircraft acquired by the aircraft information acquiring device;

excluding, when accumulating a spectrum of a digital signal corresponding to the received signal in each of the range bins, accumulation of the spectrum of a hard-target range bin and accumulation of spectra of one or more range bins farther than the hard-target range bin;

calculating a correction value corresponding to a difference between the current attitude acquired by the aircraft information acquiring device and the true traveling direction acquired by the route acquiring device; and outputting, on a basis of the correction value, an electric signal for controlling a beam angle of the optical system by the movable optical mirror or prism so as to correct a relative angular difference between the current attitude and the transmission light and cause the transmission light to observe the same space between pulses.

* * * * *